US006901862B2

(12) United States Patent
Yamaguchi et al.

(10) Patent No.: US 6,901,862 B2
(45) Date of Patent: Jun. 7, 2005

(54) IMAGE PROCESSING METHOD

(75) Inventors: Takashi Yamaguchi, Kawasaki (JP); Takeo Miki, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/624,669

(22) Filed: Jul. 23, 2003

(65) Prior Publication Data

US 2004/0121131 A1 Jun. 24, 2004

(30) Foreign Application Priority Data

Jul. 23, 2002  (JP) ........................................ 2002-214414
Apr. 23, 2003  (JP) ........................................ 2003-118468

(51) Int. Cl.⁷ ........................... B41F 27/00; G06K 9/00; H04L 9/00
(52) U.S. Cl. ...................... 101/483; 382/100; 382/135; 382/232
(58) Field of Search ................................ 101/483, 395; 385/3.28, 232; 382/100, 183, 135, 232

(56) References Cited

U.S. PATENT DOCUMENTS

| | | | | |
|---|---|---|---|---|
| 5,407,893 A | | 4/1995 | Koshizuka et al. | ......... 503/227 |
| 5,636,565 A | * | 6/1997 | Lawrance et al. | ............ 101/32 |
| 5,661,574 A | | 8/1997 | Kawana | ...................... 358/501 |
| 5,946,414 A | | 8/1999 | Cass et al. | .................. 382/183 |
| 5,974,150 A | | 10/1999 | Kaish et al. | ......... 713/179 |
| 5,995,638 A | | 11/1999 | Amidror et al. | ............ 382/100 |
| 6,095,566 A | | 8/2000 | Yamamoto et al. | ........... 283/75 |
| 6,104,812 A | * | 8/2000 | Koltai et al. | .................. 380/51 |
| 6,438,251 B1 | | 8/2002 | Yamaguchi | ................. 382/100 |
| 6,556,688 B1 | | 4/2003 | Ratnakar | ..................... 382/100 |
| 6,567,534 B1 | * | 5/2003 | Rhoads | ....................... 382/100 |
| 6,724,921 B2 | * | 4/2004 | Yamaguchi | ................. 382/118 |
| 6,728,390 B2 | * | 4/2004 | Rhoads et al. | .............. 382/100 |
| 6,750,985 B2 | * | 6/2004 | Rhoads | ...................... 358/3.28 |
| 6,760,464 B2 | * | 7/2004 | Brunk | ........................ 382/100 |
| 6,763,123 B2 | * | 7/2004 | Reed et al. | .................. 382/100 |
| 6,768,558 B1 | * | 7/2004 | Yamashita et al. | ......... 358/1.18 |
| 6,804,377 B2 | * | 10/2004 | Reed et al. | ................. 382/100 |
| 2001/0040980 A1 | | 11/2001 | Yamaguchi | ................. 382/100 |
| 2002/0038612 A1 | * | 4/2002 | Iwazaki | ..................... 382/100 |
| 2002/0080996 A1 | | 6/2002 | Rhoads | ...................... 382/100 |
| 2003/0035045 A1 | | 2/2003 | Miki | ......................... 347/213 |

FOREIGN PATENT DOCUMENTS

| | | |
|---|---|---|
| EP | 0 921 675 A2 | 6/1999 |
| EP | 1 014 318 A2 | 6/2000 |
| EP | 1 136 947 A2 | 9/2001 |
| EP | 1 168 817 A2 | 1/2002 |
| JP | 6-59739 | 8/1994 |
| JP | 9-248935 | 9/1997 |
| JP | 11-168616 | 6/1999 |
| JP | 11-355554 | 12/1999 |
| JP | 2001-268346 | 9/2001 |
| JP | 2001-274971 | 10/2001 |

OTHER PUBLICATIONS

A. K. Bhattachariya et al., "Data Embedding in Text for a Copier System," Image Processing, 1999, ICIP 99, Proceedings, pp. 245–249.

D. Delannay et al., "Generalized 2–D Cyclic Patterns for Secret Watermark Generation," ICIP 2000—IEEE Signal Processing Society International Conference on Image Processing, vol. 2, Sep. 10, 2000, pp. 77–79.

* cited by examiner

Primary Examiner—Andrew H. Hirshfeld
Assistant Examiner—Wasseem H. Hamdan
(74) Attorney, Agent, or Firm—Pillsbury Winthrop LLP

(57) ABSTRACT

Sub-information is embedded in main image information having undergone thinning-out processing and rotation processing. The resultant composite image information in which the sub-information is embedded is recorded on a recording medium after performing transformation processing of rotation reverse to the rotation processing.

16 Claims, 13 Drawing Sheets

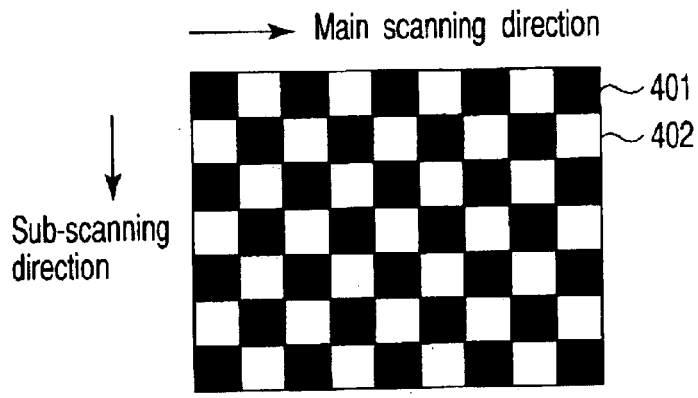
FIG. 5
FIG. 7
FIG. 8
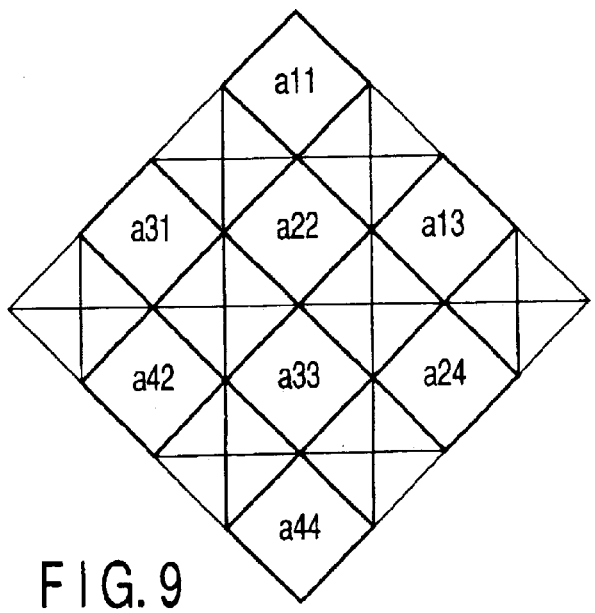
FIG. 9
FIG. 10

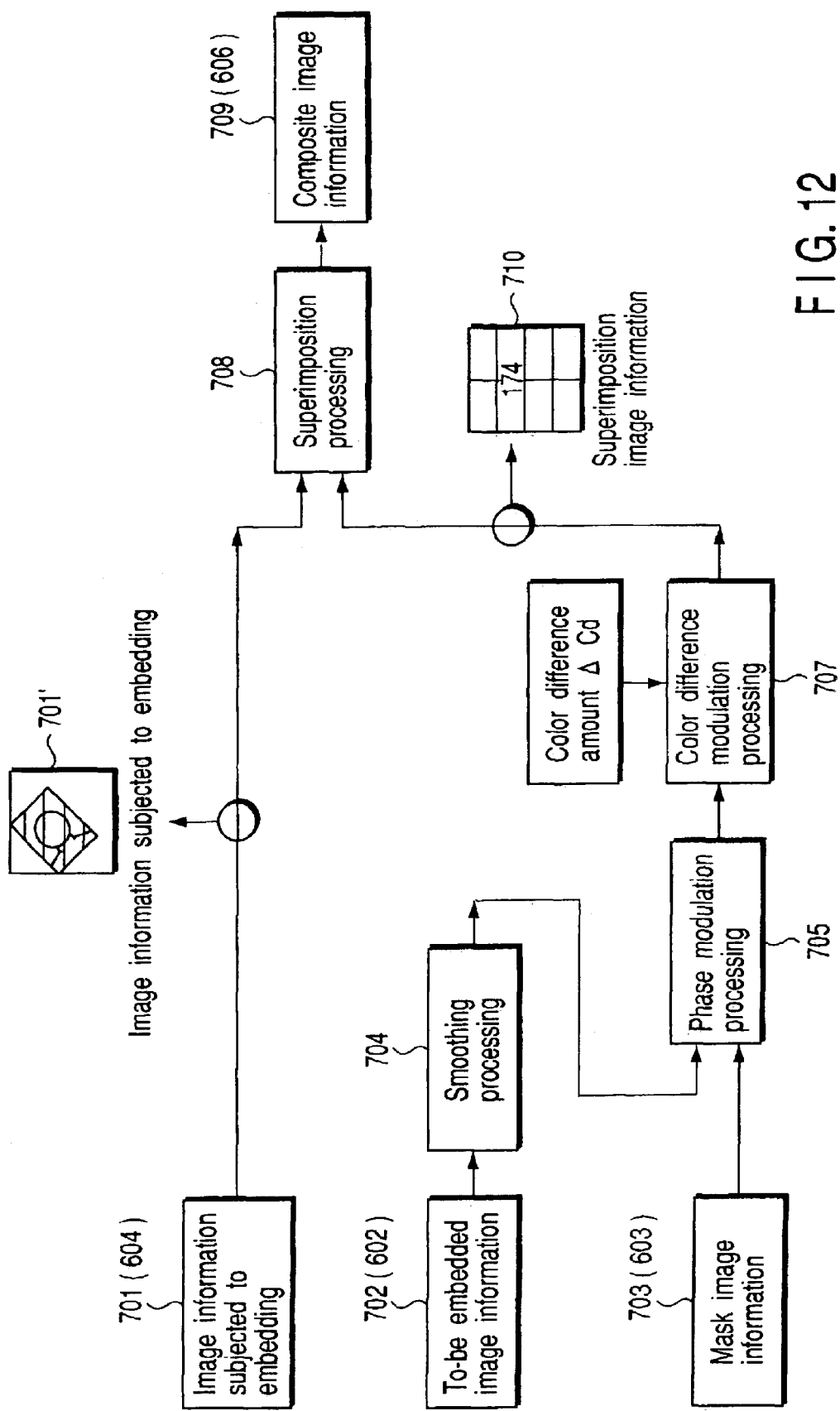
F I G. 12

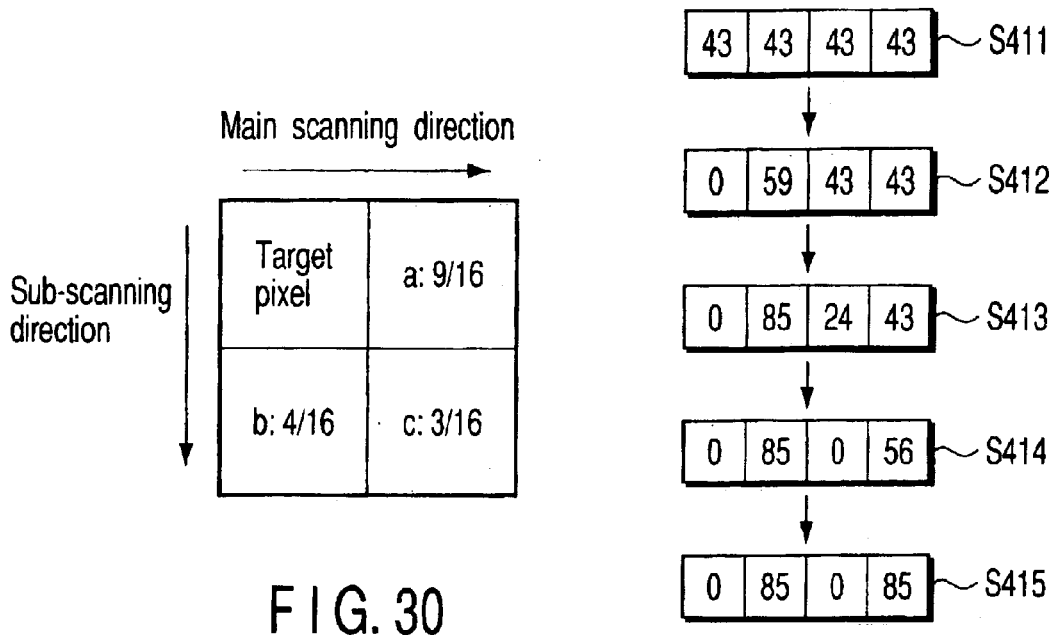
FIG. 30
FIG. 31
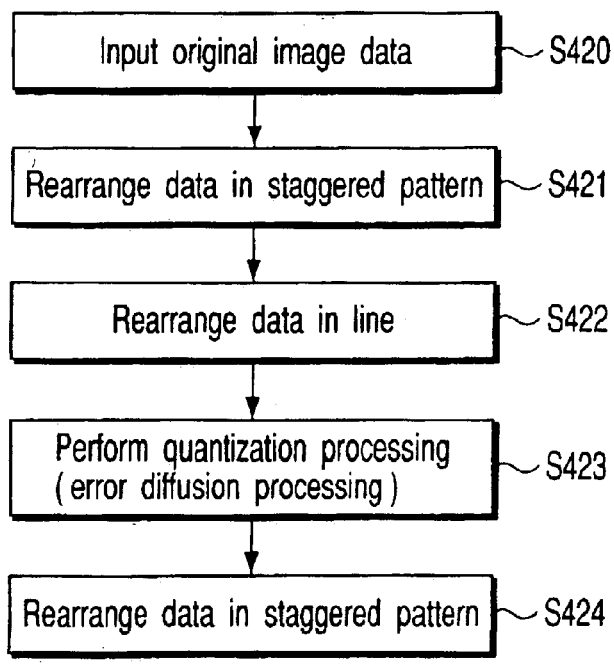
FIG. 32

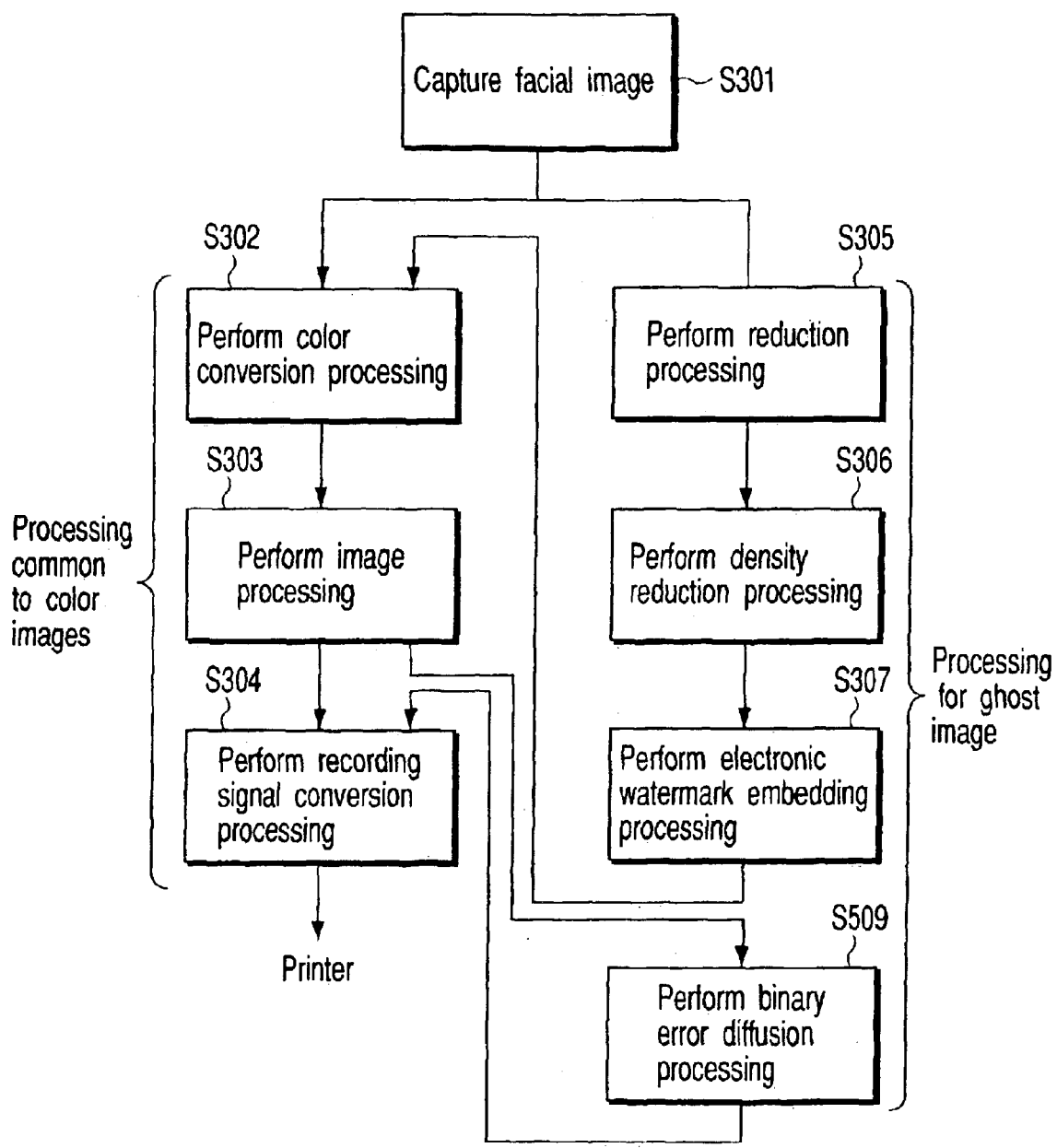
F I G. 33

IMAGE PROCESSING METHOD

CROSS-REFERENCE TO RELATED APPLICATIONS

This application is based upon and claims the benefit of priority from the prior Japanese Patent Applications No. 2002-214414, filed Jul. 23, 2002; and No. 2003-118468, filed Apr. 23, 2003, the entire contents of both of which are incorporated herein by reference.

BACKGROUND OF THE INVENTION

1. Field of the Invention

The present invention relates to an image processing apparatus which creates composite image information by embedding, in visible main image information (e.g., a human facial image), another additional sub-information (e.g., security information) in an invisible state, and restores the embedded sub-information from the recorded composite image information, and a printed material on which the composite image information created by the image processing apparatus is printed.

2. Description of the Related Art

Recently, with the trend toward computerization of information and the proliferation of the Internet, increasing importance has been attached to an electronic watermarking technique, digital signature technique, and the like to prevent counterfeiting and alteration of images. The above electronic watermarking technique is a technique of embedding additional sub-information (sub-image information) in main image information in an invisible state. For example, the electronic watermarking technique is used for a personal authentication medium such as an ID card on which personal information is recorded or a literary work. The electronic watermarking technique can prevent unauthorized copying, counterfeiting, and tampering of a personal authentication medium and literary work, thereby protecting the personal information on the personal authentication medium and the copyright of the literary work.

For example, Jpn. Pat. Appln. KOKAI Publication No. 9-248935 discloses en electronic watermarking technique of embedding data in image data output onto a printed material by using the characteristics of high spatial frequency components and color difference components which are difficult for man to perceive. Jpn. Pat. Appln. KOKAI Publication No. 2001-268346 discloses a printing apparatus for electronic watermarks that can be recognized through optical filters.

Recording apparatuses for recording composite image information created by the above electronic watermarking technique on a medium include, for example, a recording apparatus based on a sublimation/thermal transfer recording scheme and a recording apparatus based on a fusion thermal transfer recording scheme.

In general, in the sublimation/thermal transfer recording scheme, materials that can be dyed with sublimable materials are limited. For this reason, the sublimation/thermal transfer recording scheme can be adapted to only limited recording media; the degree of freedom of choice regarding recording media on which images are recorded is low. According to the sublimation/thermal transfer recording scheme, therefore, materials that can be used as recording media are limited. This tends to degrade security. In addition, sublimable dyes generally have poor image durability, e.g., poor light resistance and poor solvent resistance.

In contrast to this, in the fusion thermal transfer recording scheme, a material having good light resistance can be generally selected as a coloring material. The fusion thermal transfer recording scheme therefore allows a high degree of freedom of choice regarding recording media. In the fusion thermal transfer recording scheme, therefore, a high-specialty recording medium can be used. This makes it possible to improve security. The fusion thermal transfer recording scheme, however, uses a dot area gradation method of performing gradation recording by changing the sizes of transferred dots. With this scheme, therefore, it is difficult to realize as high gradation performance as that with the sublimation/thermal transfer recording scheme.

In order to solve this problem, for example, Jpn. Pat. Appln. KOKOKU Publication No. 6-59739 discloses a method of recording transferred dots in a so-called staggered array (this method will be referred to as an alternate driving/recording scheme hereinafter).

As described above, the electronic watermarking technique is applied not only to electronic information but also to printed materials such as driver's licenses, credit cards, and membership cards. For example, Jpn. Pat. Appln. KOKAI Publication No. 2001-274971 discloses an electronic watermarking technique of printing an image upon embedding a given image therein. According to this technique, the embedded image is difficult for man to perceive, and can be restored even after the image is printed.

A technique is also disclosed in Japanese Patent No. 2840825, in which a hologram film is formed on a personal authentication medium such as a driver's license, credit card, or membership card to prevent copying thereof.

In another known technique, security is improved by, for example, printing a facial image (to be referred to as a ghost image hereinafter) lower in density than a normal facial image on a side of the normal facial image.

BRIEF SUMMARY OF THE INVENTION

It is an object of the present invention to provide an image processing method and apparatus which create a medium with high security on which an image obtained by embedding sub-information in main image information such as a facial image or a ghost image created from a facial image is recorded, a printed material, and a printing method.

According to the present invention, there is provided an image processing method of creating composite image information by embedding sub-information in main image information, comprising performing, for the main image information, first pre-processing corresponding to pixel formation processing for image recording, performing second pre-processing as geometric transformation processing for the main image information having undergone the first pre-processing, performing embedding processing of creating composite image information by embedding sub-information in the main image information, and performing transformation processing inverse to the transformation processing in the second pre-processing for the composite image information created by the embedding processing.

According to the present invention, there is provided an image processing method of recording, on a recording medium in a visible state, composite image information created by embedding sub-information in visible main image information in an invisible state, comprising performing, for the main image information, first pre-processing corresponding to pixel formation processing for image recording, performing second pre-processing as geometric transformation processing for the main image information having undergone the first pre-processing, performing embedding processing of creating composite image information by embedding sub-information in the main image information having undergone the second pre-processing in an invisible state, performing transformation processing inverse to the transformation processing in the second pre-processing for the composite image information created by the embedding processing, and recording, on a recording medium, the composite image information, inversely transformed by the inverse transformation processing, by performing an alternate driving/recording scheme of alternately recording even-numbered and odd-numbered pixels in a main scanning direction of a recording device on a recording line basis.

According to the present invention, there is provided an image processing method of recording, on a recording medium in a visible state, composite image information created by embedding sub-information in visible main image information in an invisible state, comprising performing first pre-processing of thinning out main image information in correspondence with pixel formation processing at the time of image recording, performing second pre-processing including geometric transformation processing of, after rotating the main image information through a predetermined angle, removing a thinned-out portion from the main image information, compressing an effective portion of the main image information, and reconstructing the main image information, performing embedding processing of embedding the sub-information in the main image information having undergone the second pre-processing in an invisible state by performing color difference modulation processing using the main image information, the sub-information, and key information used to restore the sub-information, thereby creating composite image information, performing inverse transformation processing of performing transformation processing inverse to transformation processing in the second pre-processing for the composite image information after expanding and reconstructing an effective portion of the composite image information by inserting, in the composite image information, not-to-be-recorded information corresponding to the thinned-out portion of the main image information, and performing recording processing of recording, on a recording medium, the composite image information, inversely transformed by the inverse transformation processing, by performing an alternate driving/recording scheme of alternately recording even-numbered and odd-numbered pixels in a main scanning direction of a recording device on a recording line basis.

According to the present invention, there is provided an image processing method of recording, on a recording medium in a visible state, composite image information created by embedding sub-information in visible main image information in an invisible state, comprising performing first pre-processing of thinning out main image information in correspondence with pixel formation processing at the time of image recording, performing second pre-processing including geometric transformation processing of, after rotating the main image information through a predetermined angle, removing a thinned-out portion from the main image information, compressing an effective portion of the main image information, and reconstructing the main image information, performing embedding processing of embedding the sub-information in the main image information in an invisible state by superimposing the main image information and superimposition information created by performing color difference modulation processing using the sub-information and key information used to restore the sub-information, thereby creating composite image information, performing inverse transformation processing of performing transformation processing inverse to transformation processing in the second pre-processing for the composite image information after expanding and reconstructing an effective portion of the composite image information by inserting, in the composite image information, not-to-be-recorded information corresponding to the thinned-out portion of the main image information, and performing recording processing of recording, on a recording medium, the composite image information, inversely transformed by the inverse transformation processing, by performing an alternate driving/recording scheme of alternately recording even-numbered and odd-numbered pixels in a main scanning direction of a recording device on a recording line basis.

According to the present invention, there is provided an image recording apparatus comprising an embedding processing section which embeds sub-information in main image information in an invisible state by performing color difference modulation, thereby creating composite image information, an image processing section which performs pixel formation processing in the image recording apparatus for the composite image information created by the embedding processing section, and performs predetermined image processing in accordance with recording operation, and a recording section which records the composite image information processed by the image processing section on a recording medium by an alternate driving/recording scheme of alternately forming even-numbered and odd-numbered pixels in a main scanning direction of a recording device on a recording line basis.

According to the present invention, there is provided an image recording apparatus comprising a first pre-processing section which thins out main image information in correspondence with pixel formation processing in the image recording apparatus, a second pre-processing section which performs second pre-processing including geometric transformation processing of, after rotating the main image information through a predetermined angle, removing a thinned-out portion from the main image information, compressing an effective portion of the main image information, and reconstructing the main image information, an embedding processing section which embeds the sub-information in the main image information in an invisible state by performing color difference modulation processing, thereby creating composite image information, an inverse transformation processing which performs inverse transformation processing of performing transformation processing inverse to transformation processing in the second pre-processing for the composite image information after expanding and reconstructing an effective portion of the composite image information by inserting, in the composite image information, not-to-be-recorded information corresponding to the thinned-out portion of the main image information, and a recording section which performs recording processing of recording, on a recording medium, the composite image information, inversely transformed by the inverse transformation processing section, by performing an alternate driving/recording scheme of alternately recording even-numbered and odd-numbered pixels in a main scanning direction of a recording device on a recording line basis.

According to the present invention, there is provided an image recording apparatus comprising an embedding processing section which embeds sub-information in main image information in an invisible state by performing color difference modulation, thereby creating composite image information, an image processing section which doubles the number of pixels of the composite image information created by the embedding processing section in a sub-scanning direction of a recording device, and performing thinning-out processing in correspondence with pixel formation processing in the image recording apparatus, and a recording section which records the composite image information processed by the image processing section on a recording medium by using an alternate driving/recording scheme of alternately forming odd-numbered and even-numbered pixels in a main scanning direction of the recording device on a recording line basis and conveying the recording medium with a convey pitch ½ a pixel pitch in the main scanning direction.

According to the present invention, there is provided a printed material on which a facial image as a multilevel image, a ghost image as a facial image obtained by reducing a density of the facial image, and a binary image as a character are printed, wherein the ghost image is printed while binary image data obtained by performing predetermined processing for binary image data associated with an image to be printed on the printed material is embedded in the ghost image.

According to the present invention, there is provided a printing method of printing a facial image as a multilevel image, a ghost image as a facial image obtained by reducing a density of the facial image, and a binary image as a character on a printing medium, wherein the image data printed as the ghost image is created by performing predetermined processing for binary image data associated with an image to be printed on the printing medium and embedding the binary image data having undergone the predetermined processing in image data of the ghost image.

BRIEF DESCRIPTION OF THE SEVERAL VIEWS OF THE DRAWING

FIG. 5 is a view for explaining the concept of the first pre-processing;

FIG. 7 is a view for explaining a specific example of the pixel array of image data;

FIG. 8 is a view for explaining a specific example of the first pre-processing for the image data in FIG. 7;

FIG. 9 is a view for explaining a specific example of rotation processing in the second pre-processing for the image data in FIG. 8;

FIG. 10 is a view for explaining a specific example of compression processing in the second pre-processing for the image data in FIG. 10;

FIG. 12 is a flow chart schematically showing a procedure for electronic watermark embedding processing;

FIG. 30 is a view for explaining diffusion coefficients for error diffusion;

FIG. 31 is a flow chart showing an example of pixel data when quantization processing and error diffusion processing are performed;

FIG. 32 is a flow chart schematically showing a flow of processing in an image processing method; and FIG. 33 is a flow chart showing processing sequences for printing a facial image and ghost image according to the fifth embodiment.

DETAILED DESCRIPTION OF THE INVENTION

Each embodiment of the present invention will be described with reference to the several views of the accompanying drawing.

The first embodiment will be described first.

Figure 1:
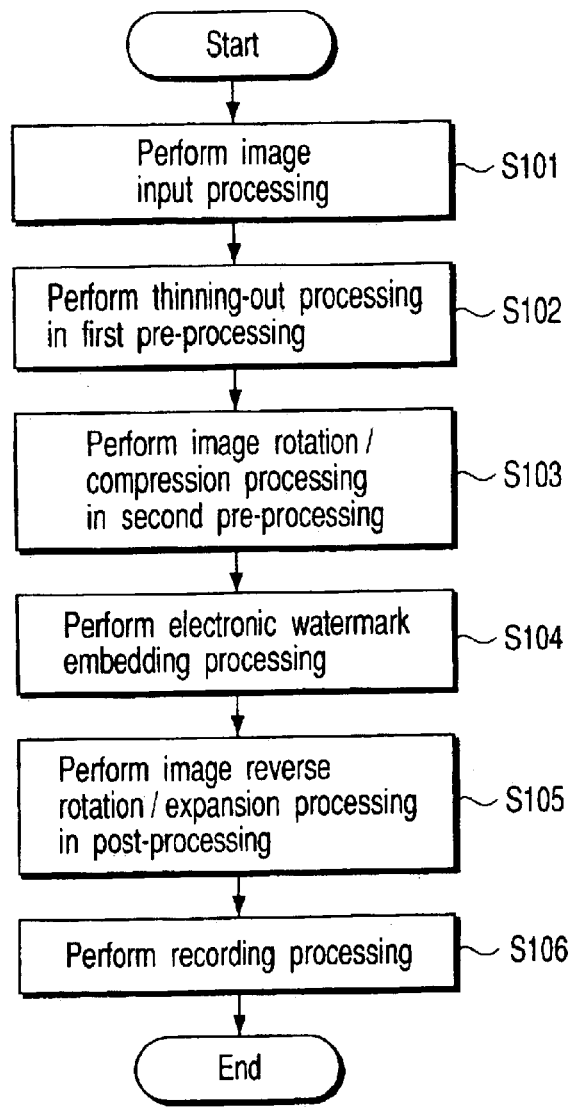
FIG. 1 is a flow chart showing the overall flow of processing in an image processing method according to the first embodiment of the present invention.

FIG. 1 is a flow chart showing the overall flow of image processing by an image recording apparatus according to the first embodiment. The operation example shown in FIG. 1 exemplifies, as the first embodiment, the flow of processing for a personal authentication facial image to be printed on a personal authentication medium such as an ID card by the above image recording apparatus.

First of all, the above image recording apparatus performs image input processing of inputting a facial image as main image information (step S101). In this image input processing, a facial image of the holder of a personal authentication medium is photographed by a camera. The resultant facial image information of the individual is then input as digital data. In the above image input processing, the facial image information of the individual may be input as digital data by capturing a facial portrait using an image input unit such as a scanner.

When the facial image is input by the above image input processing, the above image recording apparatus performs the first pre-processing for the input facial image (to be also referred to as main image information hereinafter) (step S102). In the first pre-processing, for example, thinning-out processing is performed for the facial image information input in the image input processing in step S101. With this operation, main image information having undergone the first pre-processing, corresponding to the pixel formation processing by the image recording apparatus, is created.

The above image recording apparatus then performs the second pre-processing (step S103). In the second pre-processing, image information subjected to embedding is created by geometric transformation processing. In the second pre-processing, for example, rotation processing is performed for the main image information processed in the first pre-processing, and pixel portions thinned out in the first pre-processing are removed to compress the effective image size.

When image information subjected to embedding (main image information having undergone all the pre-processing) is created by the first pre-processing and second pre-processing, the image recording apparatus performs electronic watermark embedding processing for the image information subjected to embedding (step S104). In this electronic watermark embedding processing, composite image information is created by embedding, in image information subjected to embedding, sub-information (sub-image information) in an invisible state in which the information cannot be perceived by the human eye.

When composite image information is created by the above electronic watermark embedding processing, the image recording apparatus performs post-processing for the composite image information (step S105). In this post-processing, for example, reverse rotation processing for the composite image information created in step S104, and expands the effective image size. With this post-processing, an image (to-be-recorded image information) to be recorded on a recording medium is created.

Finally, the image recording apparatus performs recording processing of recording the to-be-recorded image information created in step S105 on the recording medium serving as a personal authentication medium (step S106). In this recording processing, the to-be-recorded image information created in step S105 is recorded on the recording medium serving as a personal authentication medium by the alternate driving/recording scheme of alternately forming even-numbered and odd-numbered pixels in the main scanning direction on a recording line basis by using a recording device typified by a thermal head.

In this flow of processing, a personal authentication medium is created, on which the image obtained by embedding the sub-information in the main image information is recorded.

Figure 2:
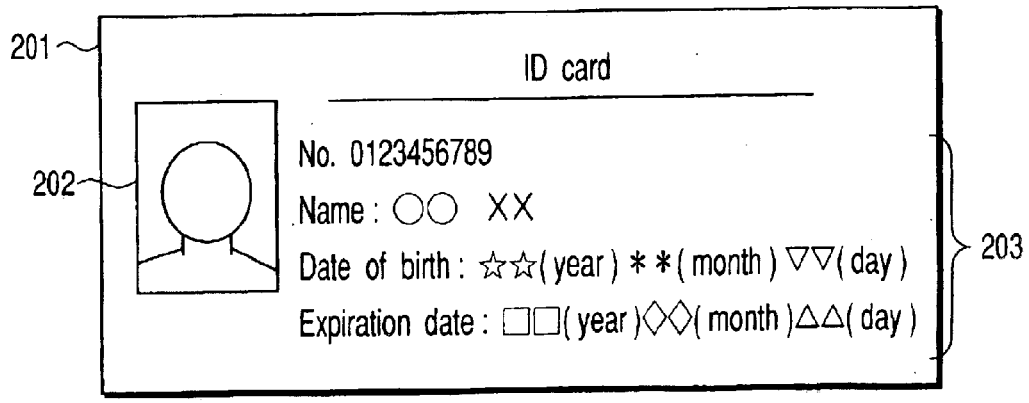
FIG. 2 is a plan view schematically showing an example of a created personal authentication medium.

FIG. 2 is a view showing a personal authentication medium 201 such as an ID card created by the processing shown in FIG. 1.

As shown in FIG. 2, a personal authentication facial image 202 of the holder is recorded on the personal authentication medium 201. The facial image 202 on the personal authentication medium 201 is the image created and recorded by the processing described with reference to FIG. 1. In addition, personal management information 203 such as an identification number (No.), name, date of birth, and expiration date is recorded on the personal authentication medium 201.

The personal authentication medium shown in FIG. 2 uses the personal management information 203 as the sub-information in the electronic watermark embedding processing in step S104 shown in FIG. 1. Consequently, the personal authentication facial image 202 of the personal authentication medium 201 is associated with the personal management information 203. This makes it difficult to partly tamper or counterfeit the personal authentication medium 201, resulting in an improvement in security.

The alternate driving/recording scheme, and more specifically, the fusion thermal transfer recording scheme of recording dots in a staggered array will be described next. In the fusion thermal transfer recording scheme of forming an image based on the presence/absence of dots, when a multi-tone image is to be expressed, the apparent density is controlled by performing area modulation processing of changing the areas of dots. For this reason, in the fusion thermal transfer recording scheme, it is required to accurately modulate the sizes of dots. In order to meet this requirement, the alternate driving/recording scheme is preferably used as the above fusion thermal transfer recording scheme.

Figure 3:
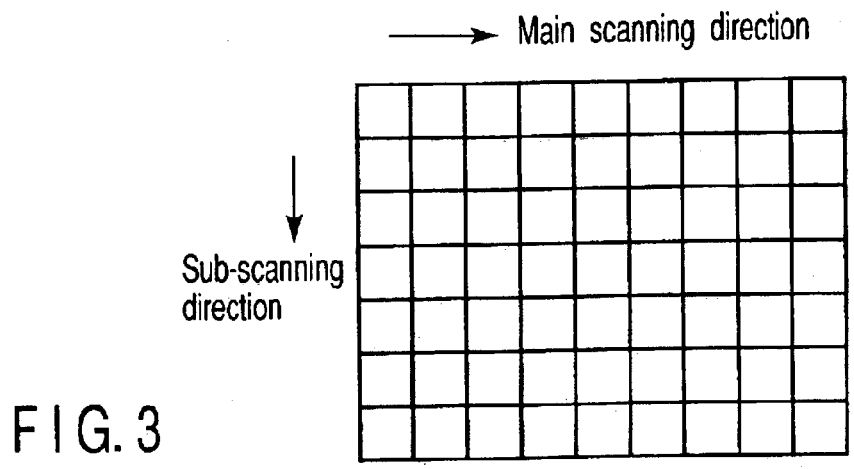
FIG. 3 is a view for explaining image interconnection to be recorded and recorded dots.
Figure 4:
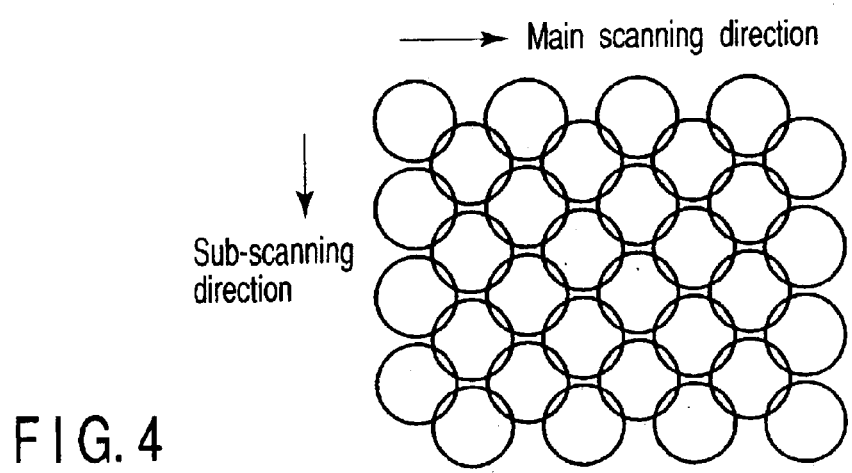
FIG. 4 is a view for explaining image interconnection to be recorded and recorded dots.

The above alternate driving/recording scheme is a scheme of alternately driving the odd-numbered heating elements of the odd-numbered lines and the even-numbered heating elements of the even-numbered lines of the recording head (line thermal head) on a recording line basis. Assume that image information to be recorded on a recording medium is arranged in a lattice pattern, as shown in FIG. 3. According to the above alternate driving/recording scheme, in actual recording operation, the image information arranged in the lattice pattern shown in FIG. 3 is recorded in a staggered pattern, as shown in FIG. 4. In the alternate driving/recording scheme, therefore, the even-numbered information of each odd-numbered line and the odd-numbered information of each even-numbered line of the image information to be recorded are omitted in actual recording operation.

In the above alternate driving/recording scheme, even if sub-information is embedded in image information (to be simply recorded) in an invisible state by using electronic watermark embedding processing, only the area ½ that of the original image information becomes effective, and the remaining information is omitted. This means that the electronic watermark in the image recorded on the recoding medium is destroyed or changed. In general, when information is omitted and an electronic watermark is destroyed in the above manner, it is very difficult to restore sub-information. This makes it impossible to maintain security.

In the first embodiment, therefore, in performing the electronic watermark embedding processing in step S104, the first pre-processing in step S102 and the second pre-processing in step S103 are performed. In addition, after the electronic watermark embedding processing in step S104, the post-processing in step S105 is performed. This makes it possible to prevent the electronic watermark in the image recorded on the recording medium from being destroyed even when the above alternate driving/recording scheme is used.

The first pre-processing and second pre-processing will be described next.

In the first pre-processing (step S102), image information corresponding to pixels to which no energy is applied in the alternate driving/recording scheme is thinned out. For example, FIG. 5 shows the overall array of image information to be recorded. Referring to FIG. 5, black portions 401 correspond to pixels to be recorded (information not to be thinned out), and white portions 402 correspond to pixels not to be recorded (information to be thinned out).

Figure 6:
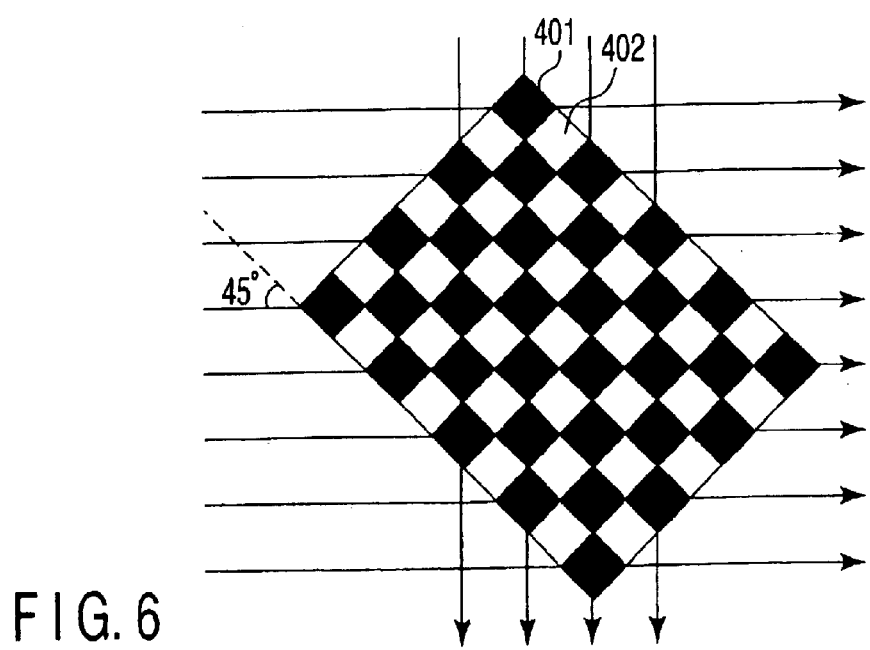
FIG. 6 is a view for explaining the concept of the second pre-processing.

In the second pre-processing (step S103), geometric transformation processing is performed for the array of the image information having undergone the first pre-processing. In the second pre-processing, for example, 45° rotation processing is performed, and thinned-out information is removed, thereby compressing the effective image information size. More specifically, when the image information array shown in FIG. 5 is rotated through 45°, the black portions 401 (information not to be thinned out) are aligned, as shown in FIG. 6. Therefore, by removing the white portions 402 (portions to be thinned out) and re-arraying the information, an array of only image information free from the influence of the alternate driving/recording scheme can be created.

The first pre-processing and second pre-processing will be further described with reference to specific examples shown in FIGS. 7 to 10.

FIG. 7 shows the array of image information to be recorded. In the image information shown in FIG. 7, 4 (rows)×4 (columns) pixels aij (i=1 to 4, j=1 to 4) are arranged. When the image information shown in FIG. 7 is thinned out by the first pre-processing, the even-numbered data of the odd-numbered lines (the pixels at the intersections of the odd-numbered rows and the even-numbered columns) and the odd-numbered data of the even-numbered lines (the pixels at the intersections of the even-numbered rows and the odd-numbered columns) of the array of the image information are thinned out. As a result, the image information shown in FIG. 7 is transformed into the image information shown in FIG. 8. More specifically, in the first pre-processing, pixels a12, a14, a21, a23, a32, a34, a41, and a43 (the array elements marked X in FIG. 8) are deleted from the image information. shown in FIG. 7.

When 45° rotation processing is performed as the second pre-processing for the image information shown in FIG. 8, the image information shown in FIG. 8 is transformed into the image information shown in FIG. 9. When the processing (compression processing as the second pre-processing) of re-arraying effective pixel elements is performed for the image information shown in FIG. 9, the image information shown in FIG. 9 is transformed into the image information shown in FIG. 10. That is, when the portions marked X in FIG. 9 are removed and the remaining pixels (effective image information elements) are re-arrayed, image information is obtained, in which pixels a11, a131, a22, a13, a41, a33, a24, and a44 are arrayed, as shown in FIG. 10. Note that in the case of the image information shown in FIG. 10, information ("0" in this case) is stored, which indicates that no information is recorded on array elements as empty spaces.

When the image information shown in FIG. 7 is compared with the image information shown in FIG. 10, the actually recorded image information or the array size of image information free from the influence of the alternate driving/recording scheme is reduced (the thick frame portion in FIG. 10). That is, when electronic watermark embedding processing is so performed as to make sub-information fall within the thick frame portion in FIG. 10, the sub-information can be recorded on a recording medium while being completely held, even in the alternate driving/recording scheme.

Note that post-processing (step S106) is processing totally reverse to the above processing.

In addition, a recording scheme other than the fusion thermal transfer recording scheme can be applied to image processing in this embodiment as long as gradation (tone) expression is realized by dot area modulation of to-be-recorded pixels.

Figure 11:
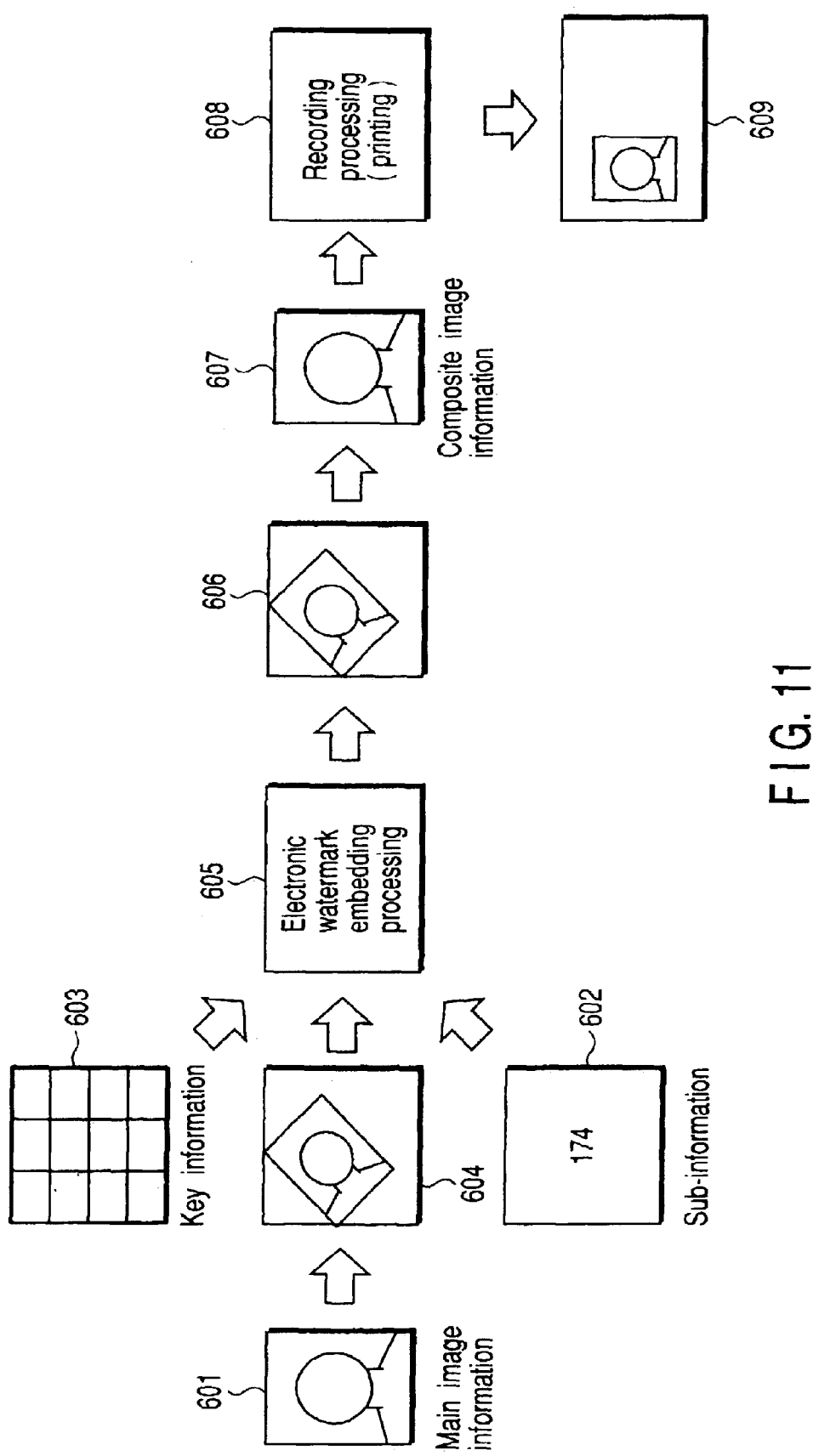
FIG. 11 is a view showing the overall flow of electronic watermark embedding processing.

FIG. 11 schematically shows a sequence for the above processing by the image recording apparatus.

Referring to FIG. 11, assume that main image information 601 is, for example, facial image information for personal authentication. In addition, sub-information 602 is information for improving the security of the main image information 601. For example, an image obtained by coding a name, date of birth, and the like or a graphic pattern such as a company logo is used as the sub-information 602. Referring to FIG. 11, assume that the sub-information 602 is "174". Key information 603 is information serving as a key for restoring the sub-information embedded in an invisible state by electronic watermark embedding processing.

First of all, the image recording apparatus creates image information 604 subjected to embedding by performing the first pre-processing and second pre-processing for the main image information 601. The image recording apparatus then performs electronic watermark embedding processing 605 by using the image information 604 subjected to embedding, sub-information 602, and key information 603 to create electronic watermarked image information 606.

The image recording apparatus creates composite image information 607 by performing post-processing for the electronic watermarked image information 606 as transformation processing inverse to the first pre-processing and second pre-processing. Finally, the image recording apparatus completes a personal authentication medium 609 by executing recording (printing) processing 608 of recording the composite image information 607 on a recording medium.

The electronic watermark embedding processing 605 will be described in detail next.

The first embodiment can use a general electronic watermark embedding technique, and is especially compatible with an electronic watermark embedding technique of performing electronic watermark embedding by superimposing sub-information on main image information.

Such electronic watermark embedding techniques are disclosed in, for example, Jpn. Pat. Appln. KOKAI Publication Nos. 11-168616 and 2001-268346. That is, the electronic watermark embedding techniques disclosed in, for example, Jpn. Pat. Appln. KOKAI Publication Nos. 11-168616 and 2001-268346 can be applied to the first embodiment. These electronic watermark embedding techniques are described on the premise that main image information is basically a color (full-color) image. By applying, for example, the technique disclosed in Jpn. Pat. Appln. KOKAI Publication No. 11-355554 to these techniques, electronic watermark embedding processing of embedding sub-information (sub-image information) even in a monochrome image can also be performed.

When it is required to determine the authenticity of an image in which an electronic watermark is embedded by the above electronic watermark embedding technique, the sub-information recorded on the image in an invisible state is restored by performing the restoration processing described in the above references and the like using key information.

FIG. 12 is a view showing the flow of electronic watermark embedding processing using the color difference modulation scheme described in Jpn. Pat. Appln. KOKAI Publication No. 11-168616. Application examples of the above color different modulation scheme to the first embodiment will be described below. The color difference modulation scheme includes the following three features (1) to (3):

(1) using the human visual characteristics;
(2) using a complementary color relationship, e.g., red+cyan=achromatic color (white) (in the case of additive color mixture); and
(3) applying a complementary color relationship and color different information (color difference modulation processing) to a high-frequency carrier pattern image.

By using the color difference modulation schemes described in cases (1) to (3), sub-information can be embedded in main image information in an invisible state.

In case (1) described above, as the frequency of an image increases, the gradation identification ability decreases, and color difference information becomes more difficult to discriminate than luminance information.

In case (2) described above, the additive color mixture of red and cyan (=green+blue) produces a complementary color relationship, so that when red and cyan are located side by side, they look achromatic, which is difficult to discriminate by the human eye.

In case (3) described above, red rich pixels and cyan rich pixels are repeatedly arranged by using a high-frequency carry pattern image. That is, this scheme utilizes the human visual characteristics that the small differences in color differences between these pixels cannot be identified by the human eye, and hence it is determined that the color difference amount is plus or minus "0".

The composite image information (electronic watermarked image) created by the above color difference modulation scheme does not depend on any image format, and hence can be expressed in any image format. For example, the composite image information (electronic watermarked image) created by the above color difference modulation scheme can be expressed in a new future image format as well as a currently available image format such as BMP, TIFF, or JPEG.

The flow of electronic watermark embedding processing in Jpn. Pat. Appln. KOKAI Publication No. 11-168616 shown in FIG. 12 will be briefly described below. For details, refer to the descriptive contents of Jpn. Pat. Appln. KOKAI Publication No. 11-168616.

Image information (main image information) 701 subjected to embedding is image information in which to-be-embedded information is embedded. For example, this information corresponds to a facial portrait (facial image) of the holder of a personal authentication medium. The image information (main image information) 701 subjected to embedding has, for example, 24-bit information per pixel (eight bits for each of R, G, and B).

A to-be-embedded image information (sub-information) 702 is obtained by converting information to be embedded into a binary image. For example, this information corresponds to the identification number of the personal authentication medium. The to-be-embedded image information (sub-information) 702 has 1-bit information per pixel.

Mask image information (key information) 703 is image information used in image combining processing and restoration (reproduction) of embedded image information. For example, the mask image information (key information) 703 has 1-bit information per pixel.

Smoothing processing 704 is performed with each black pixel of the to-be-embedded image information 702 being converted into "1"; and each white pixel, "0". For example, in the smoothing processing 704, a (3×1)-pixel area including pixels on both ends of a target pixel in the x direction is extracted, and the weighted average of the extracted area is calculated. In phase modulation processing 705, phase modulation is performed for the mask image information 703 on the basis of the smoothing processing result obtained by the smoothing processing 704.

Color difference modulation processing 707 is performed using a color difference amount ΔCd on the basis of the phase modulation result obtained by the phase modulation processing 705. In this color difference modulation processing, for example, three components, i.e., R (red), G (green), and B (blue), are separately calculated. Composite image information 709 is created by performing superimposition processing 708 on the basis of the color difference modulation processing result obtained by the color difference modulation processing 707 and the image information 701 subjected to embedding.

As is also obvious from the above description, the image information 701 subjected to embedding, to-be-embedded image information 702, and mask image information 703 in FIG. 12 are identical to the main image information 601, sub-information 602, and key information 603 in the first embodiment described with reference to FIG. 11. The electronic watermark embedding scheme shown in FIG. 12 can therefore be applied to the first embodiment.

In the first embodiment, however, in order to perform the first pre-processing and second pre-processing for main image information in advance, the array size of effective image information is smaller than the original size of the main image information as indicated by the thick frame in FIG. 10. When, therefore, the composite image information 709 is to be created by superimposing image information 701' subject to embedding and superimposition image information 710 obtained by color difference modulation processing, as in the case of electronic watermark embedding processing shown in FIG. 12, the effective portion ("174" in this case) of the superimposition image information 710 needs to completely fall within the hatched portion of the image information 701' subject to embedding.

For example, the image information 701' subject to embedding, superimposition image information 710, and composite image information 709 are defined as follows:

image information subject to embedding:

$$SRC\_C(x, y) \tag{A-1}$$

superimposition image information:

$$STL\_C(x, y) \tag{A-2}$$

composite image information:

$$DES\_C(x, y) \tag{A-3}$$

(where x and y are the coordinate values of each image, and C={R (red), G (green), B (blue)} plane. In 24-bit color computation, each value is an integral value from 0 to 255.)

In such a case, the superimposition processing 708 is expressed by $$DES\_{R(x, y)} = SRC\_{R(x, y)} + STL\_{R(x, y)} \quad \text{(B-1)}$$

$$DES\_{G(x, y)} = SRC\_{G(x, y)} + STL\_{G(x, y)} \quad \text{(B-2)}$$

$$DES\_{B(x, y)} = SRC\_{B(x, y)} + STL\_{B(x, y)} \quad \text{(B-3)}$$

In the first embodiment, R (red), G (green), and B (blue) are used as fundamental colors for computation based on the additive color mixture. However, using C (cyan), M (magenta), and Y (yellow) as fundamental colors for computation based on the subtractive color mixture makes no substantial difference.

The electronic watermark embedding scheme in FIG. 12 uses a complementary color relationship as described above to perform color difference modulation processing. In this color difference modulation processing, the predetermined color difference amount $\Delta Cd$ is used. In this case, an experimentally obtained difference amount (predetermined value) in luminance value between red and cyan is held as data.

The above superimposition image information 710 is created on the basis of the to-be-embedded image information 702, mask image information 703, and color difference amount $\Delta Cd$. In contrast to this, for the to-be-embedded image information 702, setting parameters are limited to a certain degree. This is because this information is often pertinent information for improving the security of the image information 701 subjected to embedding. The mask image information 703 serves as a key for restoring the to-be-embedded image information 702 when necessary, and hence setting parameters are limited to a certain degree. For this reason, the value of the color difference amount $\Delta Cd$ plays an important role as a setting parameter for electronic watermark embedding processing.

The values of $DES\_{R(x, y)}$, $DES\_{G(x, y)}$, and $DES\_{B(x, y)}$ are integers that fall within the range of 0 to 255 in the case of 24-bit color computation. For this reason, if the calculation result is "0" or less, the corresponding value is set to "0". If the calculation result is "255" or more, the corresponding value is set to "255". If, however, the calculation result is smaller than "0", an underflow occurs. If the calculation result is larger than "255", an overflow occurs. In such a case, the color difference balance is lost, and a complementary color relationship may not hold. In this case, the mask image information 703, which should have been embedded in an invisible state, may become visible and exposed. In the case shown in FIG. 12, since the color difference amount $\Delta Cd$ used for color difference modulation processing is a predetermined fixed value, an underflow or overflow does not easily occur.

The first correction method of preventing an overflow and underflow like those described above will be described below.

Figure 13:
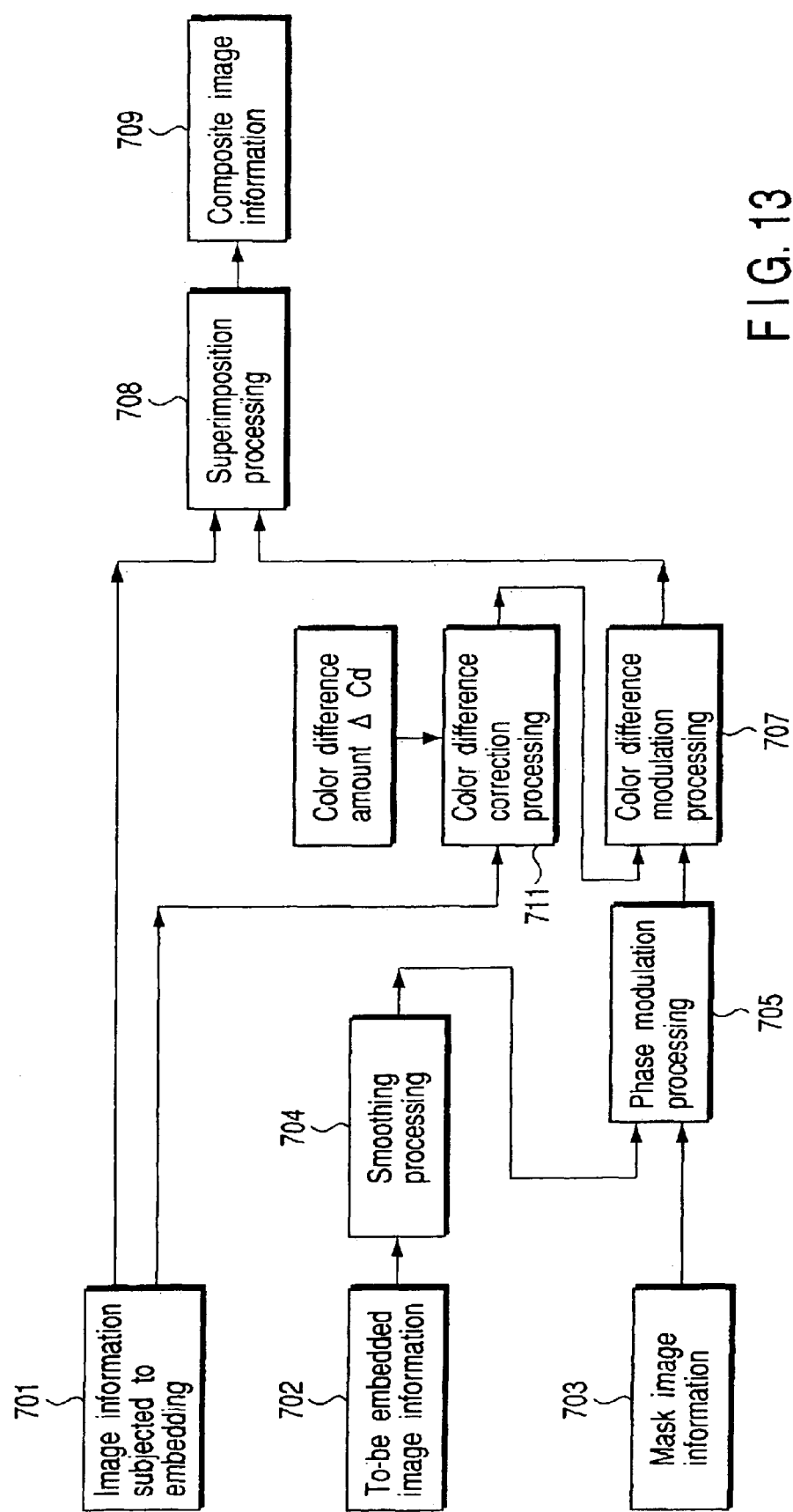
FIG. 13 is a flow chart schematically showing a procedure for electronic watermark embedding processing which prevents an overflow and underflow.

In the first correction method, as shown in FIG. 13, before the color difference modulation processing 707 is performed in the processing in FIG. 12, color difference correction processing 711 for correcting the color difference amount $\Delta Cd$ on a pixel basis is executed in accordance with each pixel information of the image information 701 subjected to embedding. That is, the color difference modulation processing 707 is performed by correcting the above color difference amount $\Delta Cd$ to an appropriate value as well as using the predetermined color difference amount $\Delta Cd$. This makes it possible to prevent the occurrence of an underflow and overflow in the processing results obtained by the color difference modulation processing 707 and superimposition processing 708, thereby keeping the complementary color relationship.

The above color difference correction processing 711 is implemented by, for example, processes (1) to (4) described below:

(1) checking the distribution of the luminance information of each pixel of image information subjected to embedding;

(2) after color difference modulation processing of the color difference amount $\Delta Cd$ (fixed value), obtaining pixels that will overflow or underflow upon superimposition processing on the basis of the information obtained in process (1) described above, thereby creating a table;

(3) performing first superimposition processing on the basis of the information of the table created in process (2) described above, and then calculating a color difference correction amount $\Delta Cd-2$, on a pixel basis, with which no overflow or underflow occurs; and (4) performing color difference modulation processing by using the color difference amount $\Delta Cd$ (fixed value) and the color difference correction amount $\Delta Cd-2$ obtained in process (3) described above.

The second correction method of preventing an overflow and underflow, which is different from the above method, will be described next.

In the second correction method, the distribution of the pixel luminance values of image information subjected to embedding (created from main image information) is compressed within a predetermined range before sub-information is embedded in the image information in electronic watermark embedding processing.

Figure 14:
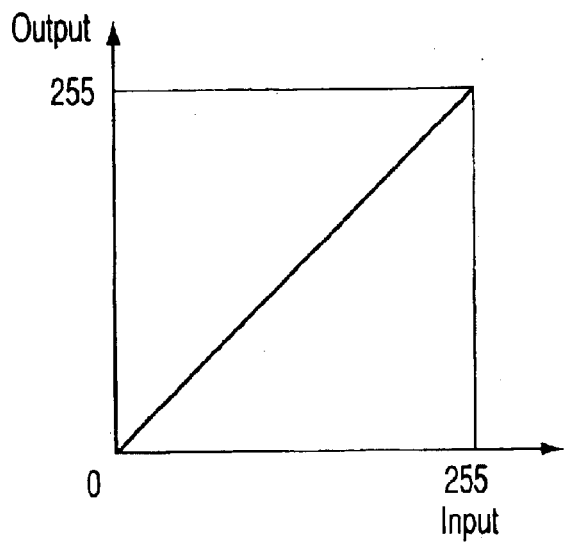
FIG. 14 is a graph for explaining an example of electronic watermark embedding processing.

In the case of 24-bit color computation, the luminance value of each pixel takes an integral value from 0 to 255. For this reason, when no compression processing is done, the luminance value of an input pixel and the luminance value of an output pixel have a relationship represented by a function of a straight line with a slope of "1", as shown in FIG. 14. That is, FIG. 14 shows that there is no influence on the luminance value of each pixel of the image information subjected to embedding.

Figure 15:
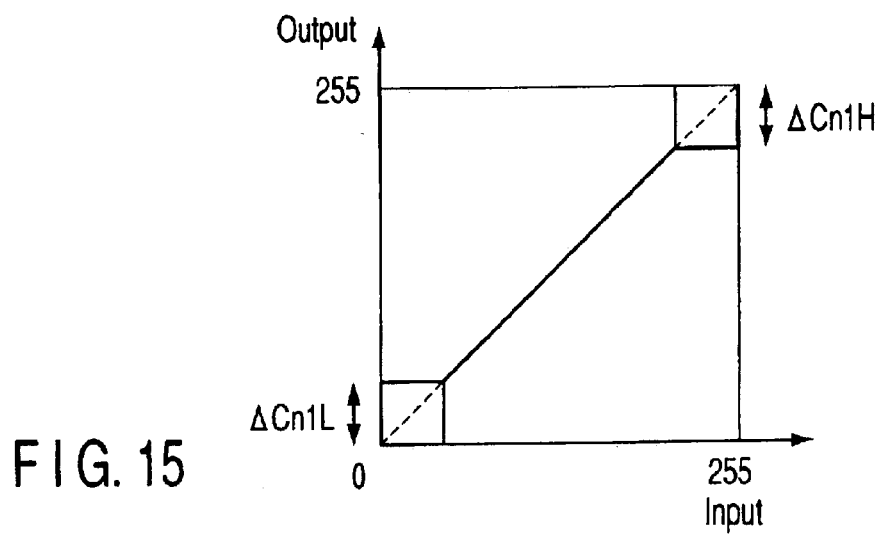
FIG. 15 is a graph for explaining the first example of electronic watermark embedding processing which prevents an overflow and underflow.

In contrast to this, FIG. 15 is a view showing the relationship between the luminance value of an input pixel and the luminance value of an output pixel when the high-luminance and low-luminance portions of the input pixels are respectively output as predetermined luminance values.

In the case shown in FIG. 15, each high-luminance input pixel (each pixel with a luminance value equal to or more than $255-\Delta Cn1$) is output as a predetermined luminance value ($255-\Delta Cn1H$), whereas each low-luminance input pixel (each pixel with a luminance value equal to or less than $\Delta Cn1L$) is output as a predetermined luminance value ($\Delta Cn1L$). According to the case shown in FIG. 15, of the luminance values of pixels to be output, low luminances (lower than $\Delta Cn1L$) and high luminances (higher than $255-\Delta Cn1H$) are cut.

When electronic watermark embedding processing is performed after the luminance value of each pixel of image information subjected to embedding is compressed on the basis of the function shown in FIG. 15, the luminance value of each pixel of the image information subjected to embedding has a margin of $\Delta Cn1H$ on the high-luminance side, and a margin of $\Delta Cn1L$ on the low-luminance side. This makes it possible to-prevent an overflow in the above superimposition processing within the range of $\Delta Cn1H$ on the high-luminance side, and an underflow in the superimposition processing within the range of $\Delta Cn1L$ on the low-luminance side.

When the luminance value of each pixel of image information subjected to embedding is compressed on the basis of the function shown in FIG. 15, high and low luminance values are cut, but intermediate luminance values between them (luminances between high and low luminances) are output without any changes in the input values. For this reason, in a portion where the luminance values of input pixels are intermediate values, the tone of the image can be maintained. However, in portion where the luminance values of input pixels are high or low luminances, discontinuous luminance values appear.

Figure 16:
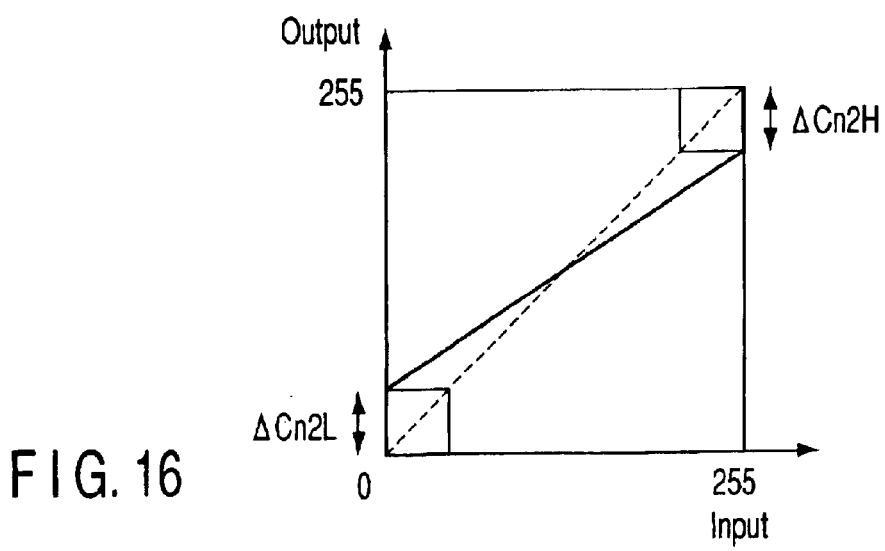
FIG. 16 is a graph for explaining the second example of electronic watermark embedding processing which prevents an overflow and underflow.

In the case shown in FIG. 16, high-luminance portions of input pixels (areas with luminance values equal to or more than 255−ΔCn1H) and low-luminance portions (areas with luminance vales equal to or less than ΔCn1L) are cut, and the luminance values are uniformly compressed and output. That is, FIG. 16 shows a function of a straight line connecting a point (255, 255−ΔCn1H) at which the luminance value of an output pixel is set to 255−ΔCn1H when the luminance value of an input pixel is 255 and a point (0, ΔCn1L) at which the luminance value of an output pixel is set to ΔCn1L when the luminance value of an input pixel is 0.

When electronic watermark embedding processing is performed after the luminance value of each pixel of image information subjected to embedding is compressed on the basis of the function shown in FIG. 16, the luminance value of each pixel of the image information subjected to embedding has a margin of ΔCn1H on the high-luminance side, and a margin of ΔCn1L on the low-luminance side. This makes it possible to prevent an overflow in the above superimposition processing within the range of ΔCn1H on the high-luminance side and an underflow in the superimposition processing within the range of ΔCn1L on the low-luminance side. When electronic watermark embedding processing is performed after the luminance value of each pixel of image information subjected to embedding is compressed on the basis of the function shown in FIG. 16, all the low-luminance portions, intermediate-luminance portions, and high-luminance portions can be continuously expressed in gradation.

If, however, the slope of a straight line like the one shown in FIG. 16 is excessively changed, the difference between the sub-information and the main image information increases. This may produce a sense of incongruity. In order to solve this problem, after electronic watermark embedding processing is performed upon compression of the luminance value of each pixel of image information subjected to embedding on the basis of the function shown in FIG. 16, the image information may be processed by a function for transformation inverse to that in FIG. 16. This makes it possible to solve the above problem even if the luminance value of each pixel of image information subjected to embedding is compressed on the basis of the function shown in FIG. 16.

The compression processing of the luminance value of each pixel with respect to the above image information subjected to embedding can produce a better effect when it is used together with the color difference correction processing 711 in FIG. 13 described above.

A method of restoring sub-information when it is necessary to determine the authenticity of the image created by the image processing method described above will be described next.

In the first embodiment, after sub-information is embedded in main image information in an invisible state by electronic watermarking, key information is used to restore the sub-information from the recorded composite image information. As this key information, a binary (monochrome) image having a geometric pattern or the like is used. For example, this pattern includes a checkered pattern which is constituted by 2×3 pixels and has a period, and a pseudo-random pattern formed on a predetermined sheet.

The first restoration method will be described first.

The first restoration method is a restoration method of restoring (reproducing) sub-information by physically superimposing a restoration sheet on the composite image information recorded on a personal authentication medium or the like. In this case, the sub-information can be visually checked by the naked eye. The restoration sheet is a transparent recording medium on which a graphic pattern for restoring the sub-information of a composite image is recorded. The graphic pattern for restoring the sub-information of the composite image is generated on the basis of key information. The graphic pattern recorded on the restoration sheet is formed as follows. First, only rotation processing in the second pre-processing (step S103) in FIG. 1 is performed for image information having the black pixels of key information as to-be-recoded information and the white pixels of the key information as not-to-be-recorded information. Thereafter, the even-numbered and odd-numbered pixels in the main scanning direction of a recording device are alternately recorded on a recording line basis in the same manner as in the recording processing (step S106) in FIG. 1 described above.

The second restoration method will be described next.

Figure 17:
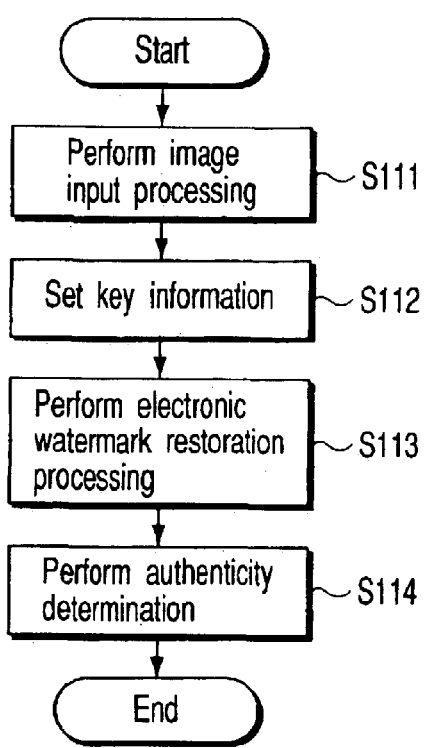
FIG. 17 is a flow chart for explaining the flow of restoration processing of sub-information.
Figure 22:
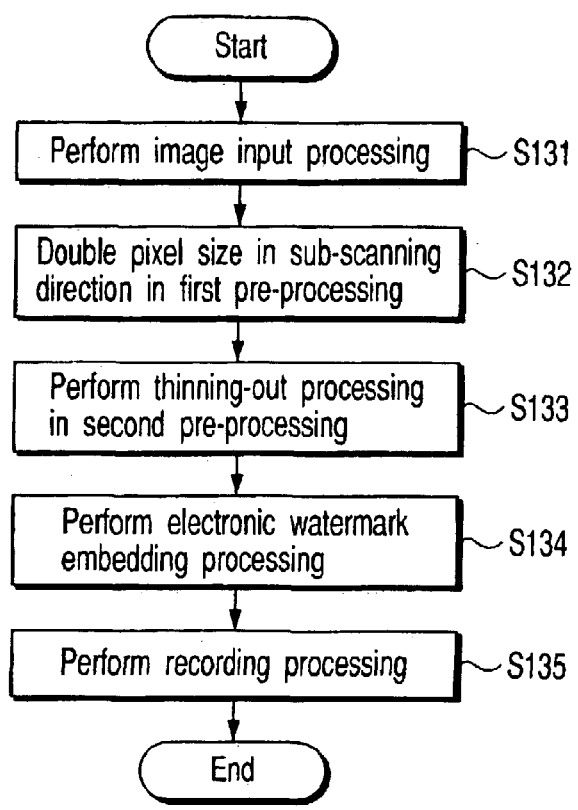
FIG. 22 is a flow chart for explaining the flow of actual processing according to the second embodiment.

The second restoring method is a method of restoring sub-information by using a frequency filter. FIG. 17 is a flow chart for explaining the flow of the processing of restoring sub-information from a composite image recorded on a personal authentication medium and determining the authenticity of the sub-information.

In the second restoration method, a restoration apparatus (authentication apparatus) for restoring sub-information from a composite image performs image input processing of inputting the composite image recorded (printed) on a personal authentication medium or the like (step S111). In this image input processing, an image input device such as a scanner or camera is used to read the composite image recoded on the personal authentication medium as digital data.

The above restoring apparatus then performs key information setting processing of setting information of the special frequency of key information corresponding to the composite image to be restored (step S112).

If, for example, there are a plurality of pieces of key information, key information to be used for the composite image recorded on each personal authentication medium is determined on the basis of information (e.g., identification information) associated with the personal authentication medium. That is, in the above key information setting processing, key information for the composite image recorded on a personal authentication medium is specified on the basis of information (e.g., identification information) associated with the personal authentication medium, and information of the specific frequency of the key information is set.

If there is only one piece of key information, information of the specific frequency of the key information stored in the memory may be read out and set in the above key information setting processing. Assume that in this case, information of the specific frequency of the key information is held in the memory in the restoration apparatus in advance.

The restoration apparatus then performs electronic watermark restoration processing of restoring the sub-information embedded as an electronic watermark in the composite image (step S113). In this electronic watermark restoration processing, frequency filtering processing is performed for the composite image information input in the image input processing by using the specific frequency set in the above key information setting processing. For this frequency filtering processing, for example, FFT computation and a digital frequency filter can be used. With this electronic watermark restoration processing, sub-information is restored from the composite image recorded on the personal authentication medium.

Finally, the restoration apparatus performs authenticity determination processing of performing personal authentication (authenticity determination) on the basis of the processing result obtained by the above electronic watermark restoration processing (step S114). In this authenticity determination processing, it is determined whether or not the sub-information restored by the processing in steps S111 to S113 described above is authentic. The determination result obtained by this authenticity determination processing is notified to the person who has made determination.

In using the second restoration method, if main image information contains many frequency components similar to the specific frequency component of key information, the sub-information may not be accurately restored, and authenticity determination may not be accurately performed. The restoration precision of sub-information can be improved by removing or weakening frequency component of main image information which are similar to the specific frequency component of key information in advance.

If there are a plurality of pieces of key information, key information having a frequency component exhibiting little similarity to the frequency components of main image information may be selected in performing electronic watermark embedding processing. This can improve the restoration precision of sub-information restored from a composite image by using the second restoration method.

An image recording apparatus using the above image processing method will be described next.

Figure 18:
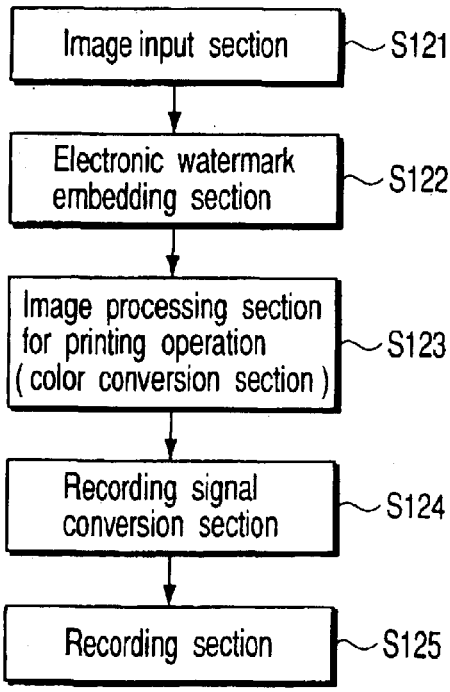
FIG. 18 is a block diagram schematically showing the arrangement of an image recording apparatus.
Figure 19:
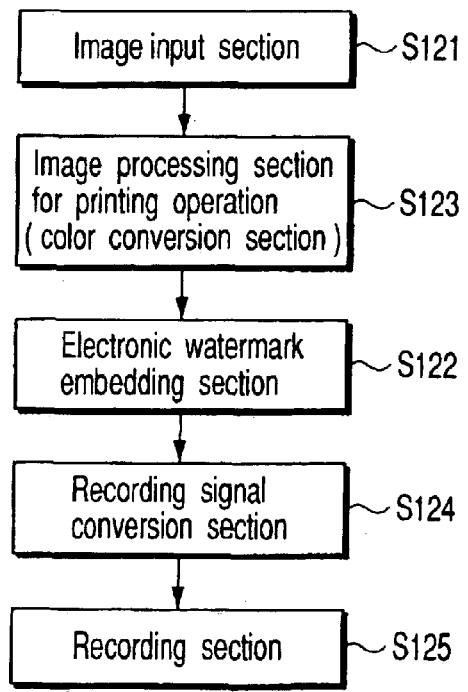
FIG. 19 is a block diagram schematically showing another arrangement of the image recording apparatus.

FIGS. 18 and 19 schematically show the arrangements of image recording apparatuses. The image recording apparatus shown in FIG. 18 or 19 is constituted by an image input section 121 serving as an image input means, an electronic watermark embedding section 122, an image processing section (color conversion section) 123 for printing operation, a recording signal conversion section 124, and a recording section 125.

The image input section 121 serves to input image information such as a facial image which is main image information. The image input section 121 inputs digital data as main image information by photographing a facial image as main image information to be recorded on a personal authentication medium or capturing a facial portrait with an input device such as a scanner. Assume that the image input section 121 inputs, for example, main image information constituted by three planes, i.e., R, G, and B planes.

The electronic watermark embedding section 122 performs the processing in steps S102 to S105 in FIG. 1. That is, the electronic watermark embedding section 122 performs the first pre-processing (step S102), second pre-processing (step S103), electronic watermark embedding processing (step S104), and post-processing (step S105).

As described with reference to step S102, the first pre-processing is thinning-out processing for main image information. As described with reference to step S103, the second pre-processing is constituted by rotation processing for the main image information having undergone the first pre-processing and compression processing for the main image information rotated by the rotation processing. As described with reference to step S104, the electronic watermark embedding processing is processing of embedding sub-information in the image information having undergone the second pre-processing. As described with reference to step S105, the post-processing is constituted by reverse rotation processing of rotating the image information, in which the sub-information is embedded by the electronic watermark embedding processing, in the reverse direction to that in the second pre-processing and expansion processing of expanding the image information having undergone the reverse rotation processing.

The image processing section (color conversion section) 123 for printing operation converts received image information into image information for printing operation. For example, the image processing section 123 performs color conversion processing of color-converting pieces of R (red), G (green), and B (blue) image information into pieces of C (cyan), M (magenta), and Y (yellow) image information. For example, in this color conversion processing, color conversion is performed by using a 3×3 or 3×9 color conversion matrix in accordance with the recording characteristics of the recording section 125.

The recording signal conversion section 124 performs recording signal conversion processing of converting pieces of C, M, and Y image information into a signal suitable for the recoding device of the recording section 125. For example, in the fusion thermal transfer recording scheme, the recording signal conversion section 124 generates a driving voltage control signal, a driving pulse signal, and the like for the thermal head. The recording signal conversion section 124 also performs heat control and the like for the thermal head.

The recording section 125 performs recording processing (printing processing) for a recording medium on the basis of signals from the recording signal conversion section 124. The recording section 125 performs printing processing by, for example, the alternate driving/recording scheme. In performing printing processing by the alternate driving/recording scheme, the recording section 125 alternately forms and records, on a recording medium, even-numbered and odd-numbered pixels in the main scanning direction of a recording device typified by a thermal head on a recording line basis on the basis of signals from the recording signal conversion section 124.

In the arrangement shown in FIG. 18, after the electronic watermark embedding section 122 performs electronic watermark embedding processing, the image processing section 123 performs image processing for printing operation. In contrast to this, in the arrangement shown in FIG. 19, after the image processing section 123 performs image processing for printing operation, the electronic watermark embedding section 122 performs electronic watermark embedding processing.

In the image recording apparatus having the arrangement shown in FIG. 18, since image processing, e.g., color conversion, for printing operation, is performed after electronic watermark embedding processing, the electronic watermark embedding section 122 processes image information constituted by three fundamental colors, i.e., R, G, and B, input from the image input section 121. In contrast, in the image recording apparatus having the arrangement shown in FIG. 19, since electronic watermark embedding processing is performed after image processing, e.g., color conversion, for printing operation, the electronic watermark embedding section 122 processes image information constituted by three fundamental colors, i.e., C, M, and Y, converted by the image processing section 123.

In the image recording apparatus having the arrangement shown in FIG. 18, image input processing and electronic watermark embedding processing are continuously performed. In the arrangement shown in FIG. 18, therefore, the image input section 121 and electronic watermark embedding section 122 can be integrated into one image processing module. In addition, in the image recording apparatus having the arrangement shown in FIG. 18, image processing (color conversion processing) for printing operation, recording signal conversion processing, and recording processing are continuously performed. In the arrangement shown in FIG. 18, therefore, the image processing section 123 for printing operation, recording signal conversion section 124, and recording section 125 can be integrated into one piece of hardware such as a printer. That is, the arrangement shown in FIG. 18 has an advantage that the arrangement of hardware for implementing an image recording apparatus is simple.

In contrast to this, in the image recording apparatus having the arrangement shown in FIG. 19, since electronic watermark embedding processing is performed after image processing (color conversion processing) for printing operation for an input image, electronic watermark data is resistant to deterioration. In general, it is preferable to minimize image processing for a composite image in which electronic watermark data is embedded. This is because the electronic watermark data embedded in the composite image may deteriorate during image processing. Therefore, the arrangement shown in FIG. 19 is advantageous over the arrangement shown in FIG. 18 in that a composite image can be printed on a recording medium without degrading the electronic watermark data embedded in the composite image.

As described above, the recording signal conversion processing by the recording signal conversion section 124 must be done immediately before the recording processing by the recording section 125. For this reason, the order of recording signal conversion processing cannot be changed. The apparatus shown in FIG. 19 is therefore configured to perform electronic watermark embedding processing immediately before recording signal conversion processing.

Figure 20:
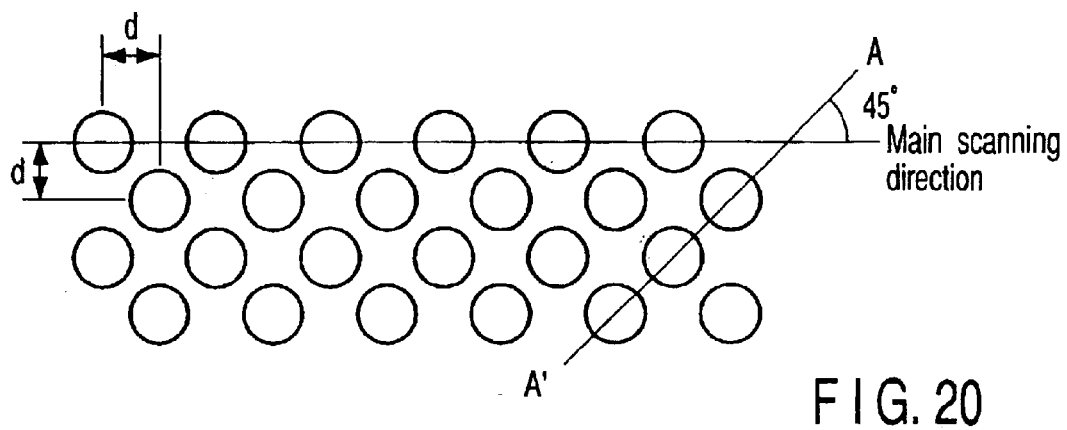
FIG. 20 is a view showing how dots recorded by the image recording apparatus are arrayed.

FIG. 20 is a view showing the array of dots in an image to be recorded by an image recording apparatus having an arrangement like that shown in FIG. 18 or 19. Referring to FIG. 20, the respective dots are arrayed at a pitch d instead of every other dot. On a line A–A' in FIG. 20, the respective dots are arranged at $1/\sqrt{2}$ the pitch of the heating elements of the thermal head instead of every other dot. In addition, the line A–A' in FIG. 20 has an angle of 45° with the main scanning direction.

The second embodiment will be described next.

The first embodiment described above has exemplified the case wherein rotation processing in the second pre-processing is performed at an angle of 45° to embed sub-information at an angle of 45°, as shown in FIG. 20. FIG. 20 shows the case wherein the interval between even-numbered and odd-numbered lines is equal to the pitch of the heating elements of the recording head (thermal head). In the case shown in FIG. 20, therefore, the direction in which dots are arrayed in a line has an angle of 45° with the main scanning direction (the horizontal direction in FIG. 20).

Figure 21:
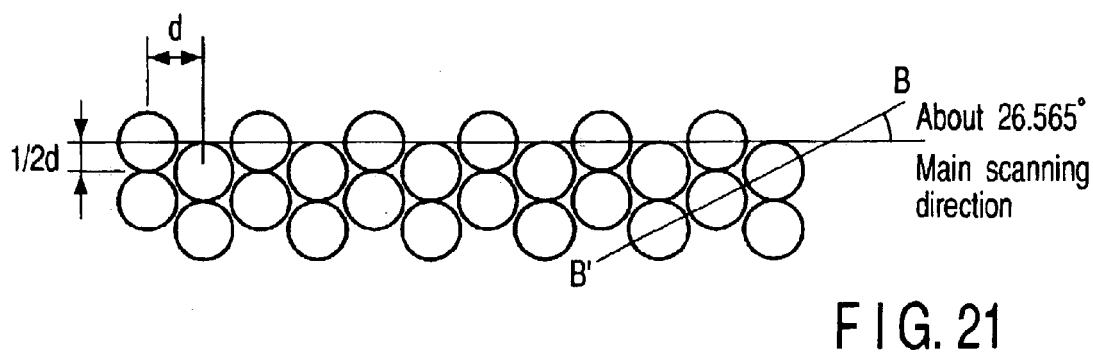
FIG. 21 is a view showing how dots recorded by an image recording apparatus according to the second embodiment of the present invention are arrayed.

The second embodiment will exemplify a case of another rotation angle as shown in FIG. 21. In the case shown in FIG. 21, the interval between even-numbered and odd-numbered lines is set to ½ a pitch d of the heating elements of a recording head (thermal head). Referring to FIG. 21, the direction in which dots are arrayed in a line has an angle of about 26.565° with the main scanning direction (the horizontal direction in FIG. 21). In this case, if sub-information is embedded in main image information at an angle like that shown in FIG. 21, the embedded sub-information is not lost even by recording processing based on the alternate driving/recording scheme.

The flow of actual processing in the second embodiment will be described. FIG. 14 is a flow chart showing the flow of processing according to the second embodiment.

First of all, the image recording apparatus performs image input processing of inputting main image information (step S131). In step S131, as in step S101 in FIG. 1, facial image information as main image information is digitized and input by photographing a facial image with a camera or capturing a facial portrait with an image input device such as a scanner.

The image recording apparatus performs the first pre-processing for the main image information input by the image input processing (step S132). In the first pre-processing, the data of the main image information in the sub-scanning direction (the feeding direction of a recording medium in the image recording apparatus), which is obtained by the image input processing in step S131, is continuously arrayed in two columns to make the pixel size in the sub-scanning direction twice the original size.

The image recording apparatus then performs the second pre-processing for the main image information having undergone the first pre-processing (step S133). In the second pre-processing, thinning-out processing is performed for the main image information obtained by the first pre-processing in step S132.

The image recording apparatus performs electronic watermark embedding processing for the main image information having undergone the second pre-processing (step S134). In this electronic watermark embedding processing, sub-information (sub-image information) is embedded as electronic watermark data in the main image information (image information subjected to embedding) for which all the pre-processing has been done. With this operation, in the electronic watermark embedding processing, composite image information is created by embedding, in the image information subjected to embedding, the sub-information (sub-image information) in an invisible state such that the sub-information cannot be perceived by the human eye. Note that the electronic watermark embedding processing is the same as that in the first embodiment, and hence a detailed description thereof will be omitted.

Finally, the image recording apparatus performs recording processing of recording, on a recording medium, the composite image information created by the above electronic watermark embedding processing (step S135). That is, in this recording processing, the pitch in the sub-scanning direction is set to ½ the pitch d in the main scanning direction, and the composite image information created in step S134 is recorded on the recording medium serving as a personal authentication medium by the alternate driving/recording scheme. The pitch in the sub-scanning direction is controlled by, for example, the convey pitch of the recording medium in the image recording apparatus. Note that the alternate driving/recording scheme is a scheme of alternately forming even-numbered and odd-numbered pixels in the main scanning direction of a recording device typified by a thermal head on a recording line basis.

As described above, in the first and second embodiments, the first pre-processing corresponding to pixel formation processing for image recording is performed for main image information. The second pre-processing of geometric transformation is then performed for the main image information having undergone the first pre-processing. Composite image information is created by embedding sub-information in the main image information having undergone the second pre-processing in an invisible state. Transformation processing inverse to the second pre-processing is performed for the created composite image information. The resultant composite image information is recorded on a recording medium by the alternate driving/recording scheme.

According to the first and second embodiments, therefore, an image processing method and image recording apparatus can be provided, which can create composite image information by embedding, in main image information to be recorded on a recording medium such as a personal authentication medium, another additional sub-information in an invisible state, and maintain the electronic watermark data in the composite image information recorded on the recording medium.

In addition, according to the first and second embodiments, an image processing method and image recording apparatus can be provided, which allow the electronic watermarking technique to be applied to a to-be-recorded image while maintaining high gradation performance in an image recording apparatus based on the fusion thermal transfer recording scheme, and can maintain electronic watermark data (sub-information) so as to protect the data from destruction even when it is recorded on a recording medium.

The third, fourth, and fifth embodiments will be described below with reference to the several views of the accompanying drawing.

The third embodiment will be described first.

Figure 23:
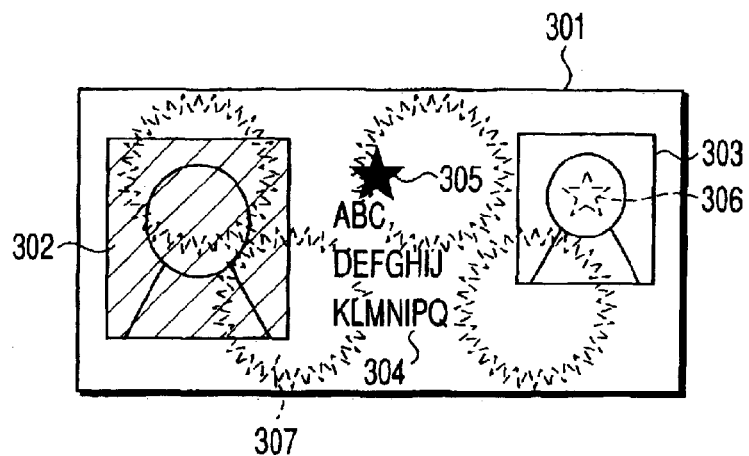
FIG. 23 is a view schematically showing the arrangement of a printed material according to the third embodiment.

FIG. 23 schematically shows the arrangement of a printed material according to the third embodiment. For example, a facial image 302, a ghost image 303, characters 304, and a predetermined graphic pattern (a star in FIG. 23) 305 are printed on a printed material 301 in a visible state. The facial image 302 is a human facial image formed from a color multilevel image. The ghost image 303 is a facial image obtained by decreasing the density of the facial image 302. The characters 304 are printed as binary images. The graphic pattern 305 is a predetermined graphic pattern such as a star.

A binary image 306 is embedded in the ghost image 303 so as to be difficult to perceive by the human eye. The binary image 306 is created from data associated with the image printed on the printed material 301. In the case shown in FIG. 23, the graphic pattern (star) 305 is printed while being embedded as the binary image 306 in the ghost image 303.

A hologram pattern 307 serving as an optical security pattern is formed on the image printed on the printed material 301. In the case shown in FIG. 23, patterning is performed such that the hologram pattern 307 does not exist on the facial portion of the ghost image 303 in which the binary image 306 is embedded.

A method of printing the facial image 302 and ghost image 303 according to the third embodiment will be described next.

Figure 24:
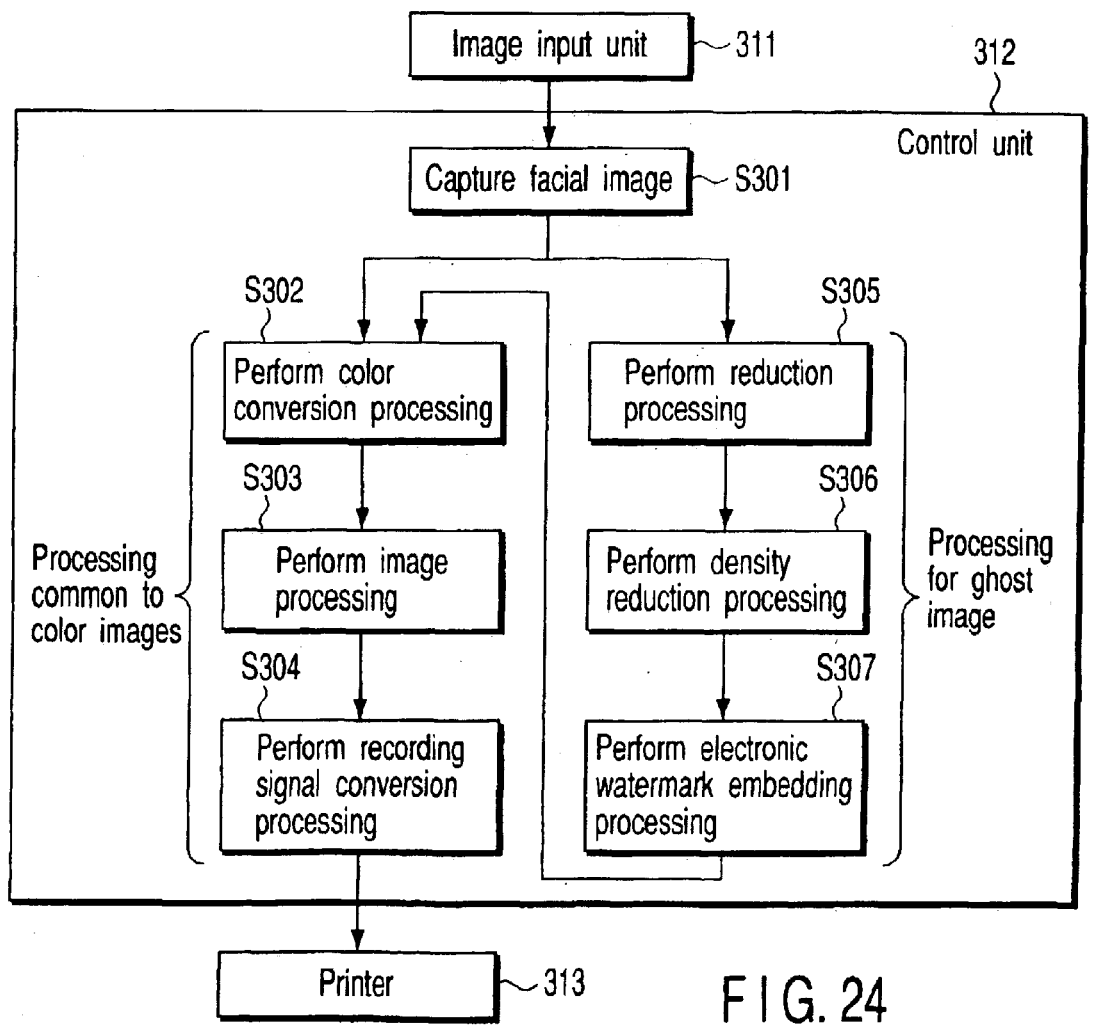
FIG. 24 is a flow chart showing processing sequences for printing a facial image and ghost image according to the third embodiment.

FIG. 24 is a flow chart for explaining printing procedures for the facial image 302 and ghost image 303. Assume that in this case, the printed material 301 is created by an image recording apparatus having an image input unit 311, control unit 312, and printer 313.

First of all, the control unit 312 performs facial image capturing processing of capturing a color human facial image (step S301). A color human facial image is captured from, for example, the image input unit 311 such as a scanner or digital camera. Assume that in the above facial image capturing processing, a facial image is captured as a color image formed from red (R), green (G), and blue (B) signals. The facial image 302 and ghost image 303 to be printed on the printed material 301 are created on the basis of the color facial image formed from the R, G, and B signals captured by this facial image capturing processing.

The processing of creating the facial image 302 will be described first. The facial image 302 is created by performing the processing in steps S302 to S304 in FIG. 24 for the color facial image captured by the above facial image capturing processing.

More specifically, upon capturing a color facial image formed from R, G, and B signals by the above facial image capturing processing, the control unit 312 performs color conversion processing of converting the R, G, and B signals of the color facial image into color signals for printing operation, including yellow (Y), magenta (M), and cyan (C) signals or Y, M, C, and black (K) signals (step S302). Image processing such as edge emphasis and brightness correction is performed for the facial image having undergone color conversion by the color conversion processing (step S303). The control unit 312 also performs recording signal conversion processing of converting the facial image having undergone the image processing in step S303 into a recording signal for driving the printer 313 (step S304). The signal generated by this recording signal conversion processing is output to the printer 313.

Note that the printer 313 is, for example, a printer designed to perform printing by using the thermal transfer recording scheme of performing thermal transfer recording by using a line thermal head having a plurality of heating elements arrayed in a line.

The ghost image 303 is processed as follows. First of all, the control unit 312 performs reduction processing of reducing the facial image captured from the image input unit 311 in step S301 (step S305). Upon reducing the facial image by this reduction processing, the control unit 312 performs density reduction processing of reducing the density of the reduced facial image to ½ or less the normal density (step S306). The image obtained by this density reduction processing is the data of a ghost image serving as a main image in which sub-information is to be embedded.

The control unit 312 then performs electronic watermark embedding processing of embedding the binary image data of the graphic pattern 305 as sub-information prepared in advance in the ghost image data obtained in step S306 (step S307). This electronic watermark embedding processing creates image data (composite image information) by embedding the above binary image data in the ghost image data. Color conversion processing (step S302), image processing (step S302), and recording signal conversion processing (step S302) are executed for this composite image information like the above facial image. As a consequence, the ghost image in which the binary image data of the graphic pattern 305 is embedded is sent as a recording signal to the printer 313.

Note that in the first embodiment, color conversion processing and image processing may be executed before electronic watermark embedding processing, as described above with reference to FIGS. 18 and 19

Through the above processing, the facial image 302 and ghost image 303 are printed on the recording medium. In this case, the ghost image 303 is a facial image with a low density. Therefore, the ghost image 303 itself is difficult to perceive by the human eye, and noise in the image is also difficult to perceive by the human eye. In addition, the binary image 306 embedded in the ghost image 303 is relatively light in color, and hence is difficult to perceive by the human eye. Note that the ghost image 303 serves to prevent tampering or copying of the printed material 301.

As described above, even if printing is performed by using a low-resolution printer, noise caused when the binary image 306 is embedded is difficult to perceive. This makes it possible to improve the security of the printed material 301. In the third embodiment, the binary image 306 is embedded in the ghost image 303. This makes tampering difficult and can improve security as compared with the case wherein only the ghost image 303 is printed.

As described above, according to the third embodiment, the facial image 302 which is a multilevel image, the ghost image 303 which is a facial image obtained by reducing the density of the facial image 302, the characters 304, and the graphic pattern 305 are printed, the ghost image 303 are printed on the printed material 301. On the printed material 301, the ghost image 303 is printed while the graphic pattern 305 printed on the printed material 301 is embedded as the binary image 306 in the ghost image 303, thereby making the image difficult to perceive by the human eye.

According to the third embodiment, therefore, a printed material and a printing method which can ensure high security can be provided.

Driving of the heating elements of the thermal head of the printer according to the present invention will be described in detail next.

The following description is based on the assumption that the printer 313 is a printer based on the fusion thermal transfer recording scheme.

The printer 313 based on the fusion thermal transfer recording scheme is designed to print image information based on the presence/absence of dots on a recording medium. In expressing a multi-tone image, the printer 313 based on the fusion thermal transfer recording scheme performs density conversion by changing the areas of dots. For this reason, the printer 313 based on the fusion thermal transfer recording scheme is required to accurately modulate a dot size. In order to accurately modulate a dot size, it is preferable to alternately drive the heating elements of the thermal head (to be described later). The alternate driving/recording scheme is a recording scheme of recording transfer dots in a staggered array.

Alternate driving of the heating elements of the thermal head is a method of alternately driving the odd-numbered heating elements of the odd-numbered lines and the even-numbered heating elements of the even-numbered lines on a recording line basis. When the heating elements of the thermal head of the printer 313 are alternately driven, dots are arrayed on the recording medium in a staggered pattern, as shown in FIG. 4. In this case, the main scanning direction is the direction in which the heating elements of the thermal head are arrayed, and the sub-scanning direction is a direction perpendicular (intersecting) to the main scanning direction.

Figure 25:
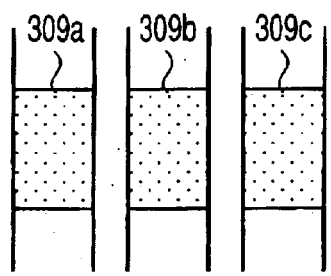
FIG. 25 is a view showing an example of the arrangement of the heating elements of the thermal head of a printer.
Figures 26, 27:
FIG. 26 is a schematic view showing a temperature distribution in the ink layer of a thermal transfer ink ribbon when the heating elements of the thermal head are simultaneously driven.
FIG. 27 is a schematic view showing a temperature distribution in the ink layer of the thermal transfer ink ribbon when the heating elements of the thermal head are alternately driven.

FIG. 25 is a view showing heating elements 309 (309a, 309b, and 309c) of the thermal head used in the printer 313. FIGS. 26 and 27 show temperature distributions in the ink layer of a thermal transfer ink ribbon which is transferred by the thermal head of the printer 313.

FIG. 26 shows the temperature distribution in the ink layer of the thermal transfer ink ribbon in a case wherein the respective heating elements 309 in FIG. 25 are simultaneously driven. When all the heating elements 309 are simultaneously driven instead of being alternately driven, the distance between the heating elements 309 that are simultaneously driven becomes small. For this reason, as indicated by solid lines a in FIG. 26, heat from the respective heating elements 309 causes thermal interference, so that the temperature distribution is flattened. With the temperature distribution shown in FIG. 26, there is no temperature contrast between the adjacent heating elements 309. When, therefore, the adjacent heating elements 309 are simultaneously driven, the printer 313 cannot perform accurate dot size modulation, resulting in difficulty in multi-tone recording.

FIG. 27 shows the temperature distribution in the ink layer of the thermal transfer ink ribbon in a case wherein the respective heating elements 309 in FIG. 25 are alternately driven. As shown in FIG. 27, in the alternate driving operation in which the adjacent heating elements 309 are not simultaneously driven (the adjacent heating elements 309 on each recording line are not driven), the distance between the heating elements 309 that are driven can be set to be large. In alternate driving operation, the distance between the heating elements 309 that are driven becomes twice the interval (pitch) between the respective heating elements 309. In this case, in the thermal head, heat escapes to the heating elements 309 that are not driven. As a consequence, heat interference hardly occurs. In alternate driving operation, therefore, as indicated by solid lines b in FIG. 27, the temperature distribution in the ink layer of the thermal transfer ink ribbon becomes steep, and a temperature contrast can be produced between the adjacent heating elements 309.

As described above, when the heating elements 309 are alternately driven, dots can be reliably formed, and the dot size can be accurately modulated without being influenced by adjacent dots. Alternate driving of the heating elements 309 allows even the printer 313 based on the fusion thermal transfer recording scheme to perform multi-tone recording using area gradation.

It is preferable that a multilevel image be printed by alternately driving heating elements, and a binary image be printed without performing alternate driving of the heat elements. Assume that multilevel image such as the facial image 302 and ghost image 303 on the printed material 301 shown in FIG. 23 are to be printed. In this case, the printer 313 performs gradation recording by alternately driving the heating elements 309. When binary images such as the characters 304 and graphic pattern 305 on the facial image 302 in FIG. 23 are to be printed, the printer 313 prints dots in lines in both the main scanning direction and the sub-scanning direction without performing alternate driving of the heat elements.

When printing is to be performed by alternately driving the heating elements 309, processing of rearranging pixel data in a staggered array is added to the image processing in step S303.

When the binary image 306 is embedded in the ghost image 303 by alternately driving the heating elements 309, the information of every other pixel of the embedded binary image 306 is lost. This is because, for example, the odd-numbered dots of each even-numbered line (or the even-numbered dots of each odd-numbered line) are not present. However, since the binary image 306 embedded in the ghost image is a graphic pattern or the like, when the binary image is restored, its shape can be ensured. This therefore allows authenticity determination using the restored binary image 306. In addition, since the binary image is embedded in the ghost image 303, the security of the printed material 301 can be improved for the same reason as described above.

The fourth embodiment will be described next.

Figure 28:
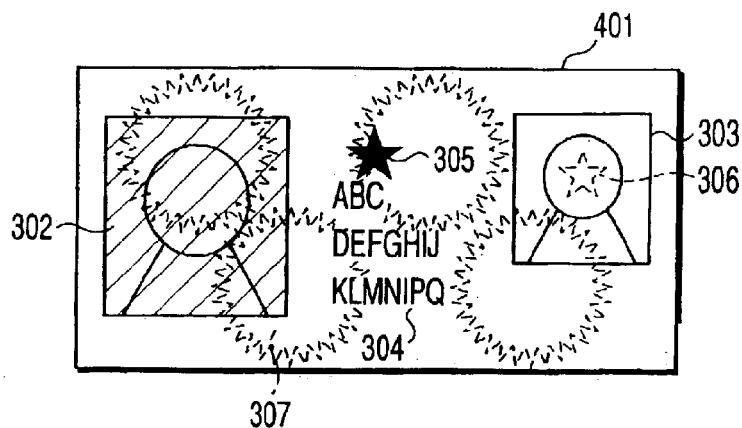
FIG. 28 is a view schematically showing the arrangement of a printed material according to the fourth embodiment.
Figure 29:
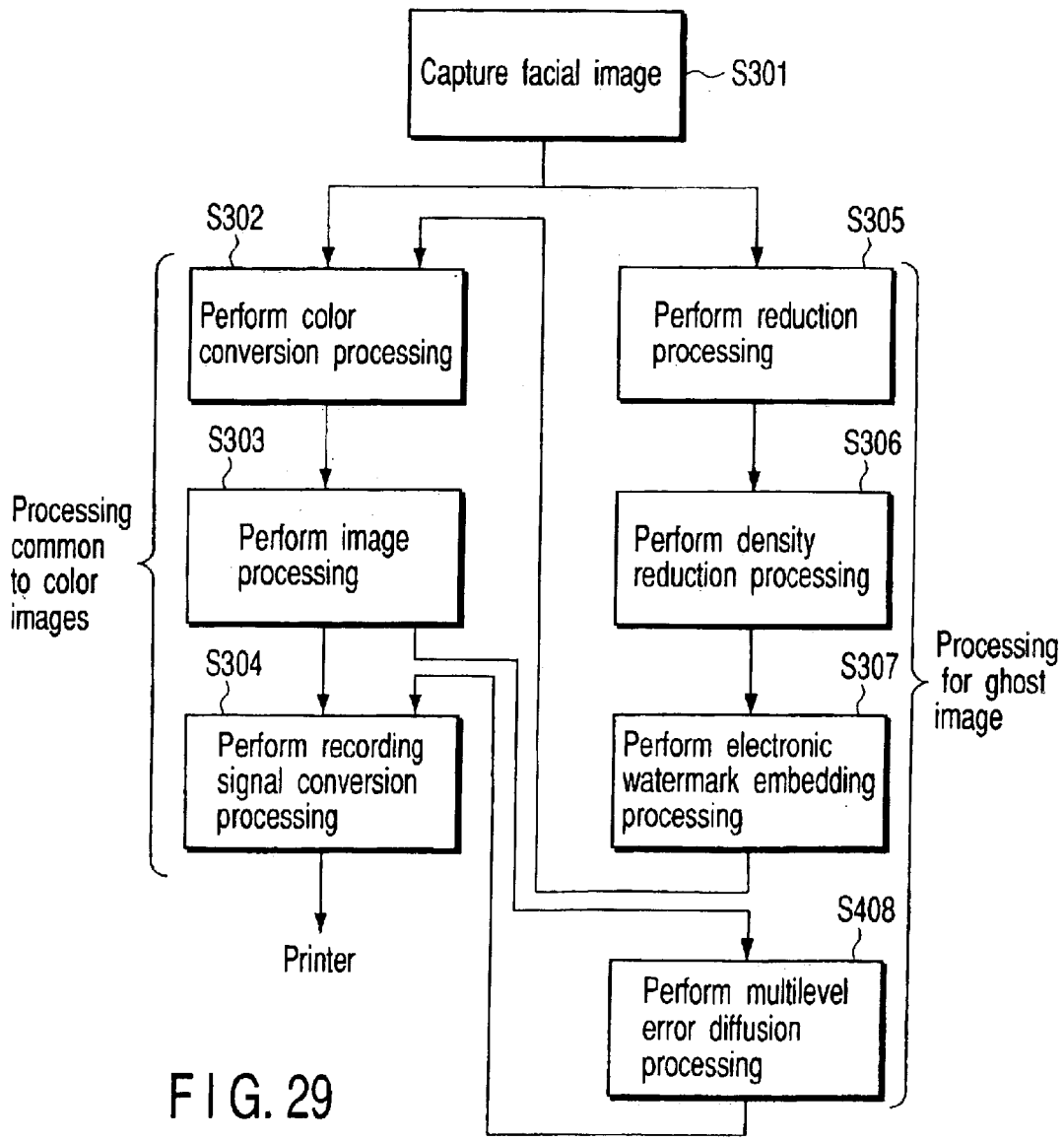
FIG. 29 is a flow chart showing processing sequences for printing a facial image and ghost image according to the fourth embodiment.

FIG. 28 schematically shows printed material 401 according to the fourth embodiment. A facial image 302, ghost image 303, characters 304, graphic pattern 305, and hologram pattern 307 are printed on the printed material 401 like the printed material 301 in FIG. 23. Since the facial image 302, characters 304, graphic pattern 305, and hologram pattern 307 are identical to those on the printed material 301 in FIG. 23, a description thereof will be omitted. The printed material 401 shown in FIG. 28 differs from the characters 304 shown in FIG. 23 in that a binary image 406 is embedded in the ghost image 303 at a certain angle. FIG. 29 shows, for example, a case wherein the binary image 406 is embedded at an angle of 45°.

As described above, in the fusion thermal transfer recording scheme, a multilevel image is recorded by the alternate driving/recording scheme to express gradation. Therefore, a dot array like that shown in FIG. 20 or 21 is obtained. As described above, FIG. 20 shows the case wherein the interval d between an even-numbered line and an odd-numbered line is equal to the pitch d of the heating elements of the thermal head. In the case shown in FIG. 20, the direction in which dots are arrayed in a line is 45° with respect to the main scanning direction (the horizontal direction in FIG. 20). FIG. 21 shows the case wherein the interval between an even-numbered line and an odd-numbered line is ½ the pitch of the heating elements of the thermal head. In the case shown in FIG. 21, the direction in which dots are arrayed in a line is about 26.565° with respect to the main scanning direction (the horizontal direction in FIG. 21).

If, therefore, the binary image 406 is embedded in the ghost image 303 at the above angle, the pixel data of the embedded binary image 406 is not lost even when alternate driving operation is performed.

FIG. 29 is a flow chart for explaining a processing sequence according to the fourth embodiment. The flow chart of FIG. 29 is a flow chart for explaining a sequence for printing processing of the facial image 302 and ghost image 303 in FIG. 28.

Printing processing of the facial image 302 is performed by the same sequence as that for the processing in FIG. 24 (steps S301 to S304). Assume that the processing of rearranging the pixel data of only a facial image in a staggered array is added to the image processing in step S303 as the printing processing of the facial image 302.

In the printing processing of the ghost image 303, multilevel error diffusion processing (step S408) is added to the processing in steps S301 to S307 in FIG. 24. That is, as shown in FIG. 29, the printing processing of the ghost image 303 is performed by sequentially executing facial image capturing processing (step S301), reduction processing (step S305), density reduction processing (step S306), electronic watermark embedding processing (step S307), color conversion processing (step S302), image processing (step S303), multilevel error diffusion processing (step S408), and recording signal conversion processing (step S304).

The multilevel error diffusion processing (step S408) shown in FIG. 29 is performed for the image data of the ghost image 303 having undergone the image processing in step S303. The recording signal conversion processing (step S304) is performed for the ghost image 303 having undergone the multilevel error diffusion processing in step S408.

Note that in the printing processing of the ghost image 303, the facial image capturing processing (step S301), reduction processing (step S305), density reduction processing (step S306), electronic watermark embedding processing (step S307), color conversion processing (step S302), and image processing (step S303) are the same as those (steps S301 to S307) in FIG. 24. In the electronic watermark embedding processing in step S307, to-be-embedded binary image data is embedded in the ghost image data at a certain angle.

A specific example of the multilevel error diffusion processing in step S408 in FIG. 29 will be described next. A case wherein the error diffusion processing is quaternary, i.e., quaternary error diffusion processing, will be described below.

Assume that in this example of quaternary error diffusion processing, the quantization resolution is set to 0 to 255. Assume also that multilevel quantization levels, i.e., set density values, are 0, 85, 170, and 255, and multilevel thresholds are 50, 128, and 210. In addition assume that with respect to a target pixel, a position a (adjacent to the target pixel in the main scanning direction) is diffused to 9/16; a position b (below the target pixel in the sub-scanning direction, to 4/16; and a position c, to 3/16.

Although quaternary error diffusion processing will be described below with the above thresholds and quantization levels, the respective values (the parameter values for multilevel error diffusion processing) may be set to other values. In addition, the quantization resolution may be set to values other than 0 to 255.

In the above multilevel error diffusion processing, multilevel quantization processing and error diffusion processing are performed on the basis of the above parameter values. In the multilevel error diffusion processing, target pixels are sequentially input in the main scanning direction (raster scan), and multilevel quantization processing and error diffusion processing are performed for each pixel. When multilevel error diffusion processing for one line is completed, multilevel error diffusion processing for the next line in the sub-scanning direction is performed. With this operation, the target pixels of each line are sequentially input in the main scanning direction to perform multilevel error diffusion processing.

That is, in multilevel error diffusion processing, target pixels are sequentially input in the main scanning direction, and multilevel quantization processing is performed on the basis of the above parameter values. The quantization errors produced during multilevel quantization processing are multiplied by diffusion coefficients in error diffusion processing. As a consequence, the quantization errors produced during the multilevel quantization processing are diffused to neighboring image regions for which no multilevel quantization processing has been performed.

Quaternary error diffusion processing will be described next with reference to an example of an image (four pixels) like the one shown in FIG. 31.

In step S411 shown in FIG. 31, the respective input data values corresponding to four pixels for one line in the main scanning direction are shown. Assume that each of the input data values of the four pixels shown in step S411 in FIG. 31 is "43" which is about half of the quantization level value "85".

First of all, in quantization processing for the first pixel, the input data value of the first pixel is compared with the threshold. In this case, the input data value ("43") of the first pixel is equal to or more than "0" and less than "50". The quantization level value of the first pixel is converted into "0". In this case, the quantization error is "43−0=43".

When a quantization error is calculated by the above quantization processing, error diffusion processing is performed on the basis of the above quantization error. In error diffusion processing for the first pixel, the value of the quantization error ("43") is multiplied by the diffusion coefficient shown in FIG. 30 for a neighboring pixel. By this error diffusion processing, the quantization error corresponding to the first pixel is diffused to the neighboring pixel. As a result, as indicated by step S412 in FIG. 31, the data value of the second pixel becomes "59" obtained by adding the diffusion error to "43".

Similar to the processing for the first pixel, the second pixel is subjected to multilevel quantization processing. As a result of this processing, the quantization error is diffused to a neighboring pixel. As a result, as indicated by step S413 in FIG. 31, the quantization level value of the second pixel is converted into "85". The quantization error in the multilevel quantization processing for the second pixel becomes "59−85=−26", and the data value of the third pixel becomes "24".

The third pixel is subjected to multilevel quantization processing in the same manner. As a result of this processing, the quantization error is diffused to a neighboring pixel. As a consequence, as indicated by step S414 in FIG. 31, the quantization level value of the third pixel is converted into "0", and the data value of the fourth pixel becomes "56". The fourth pixel is subjected to multilevel quantization processing in the same manner. As a result of this processing, the quantization error is diffused to a neighboring pixel. As a consequence, as indicated by step S415 in FIG. 31, the quantization level value of the fourth pixel is converted into "85".

The data value of each pixel shown in step S415 in FIG. 31 is the final processing result of quaternary error diffusion processing for each pixel in step S411. Therefore, the data values of a group of pixels each having pixel data ½ the quantization level value "85" (four pixels each having an input data value of "43") are alternately converted into "85".

That is, when the first and second pixels are viewed macroscopically, the density of the corresponding portion looks about "43", which is almost half of "85". When multilevel error diffusion processing is performed, the gradation of an image viewed as a macro-area is maintained, and hence an image conforming to the input image can be obtained.

In the above multilevel error diffusion processing, target pixels are sequentially input in the main scanning direction, and neighboring pixels subjected to error diffusion are pixels around each target pixel (there is no gap corresponding to even one pixel).

In this case, each pixel data (image data for printing operation in the alternate driving scheme) for recording an image by using the alternate driving scheme for the heating elements must be set such that each adjacent pixel in the main scanning direction has "0" data. In image data for printing operation based on the alternate driving scheme, therefore, each pixel to which an error should be diffused is not located adjacent to a corresponding target pixel.

In addition, in image data for printing operation based on the alternate driving scheme, the nearest adjacent pixel to each target pixel is a lower oblique pixel with respect to the target pixel. That is, in image data for printing operation based on the alternate driving scheme, a pixel to which an error should be diffused most is not, the next pixel to the target pixel in the main scanning direction. For this reason, if general error diffusion processing is performed for image data for printing operation based on the alternate driving scheme, a quantization error is not properly diffused in a printer based on the alternate driving scheme. As a consequence, the gradation of an image regarded as a macro-area may not be maintained.

In the fourth embodiment, therefore, the multilevel error diffusion processing shown in FIG. 29 is performed by a processing sequence like that shown by the flow chart of FIG. 32. First of all, in the multilevel error diffusion processing (step S408) shown in FIG. 29, image data is input as original image data through the image processing in step S303 in FIG. 29 (step S420). This original image data is formed from monochrome pixel data decomposed into Y, M, and C components or Y, M, C, and K components. After desired data processing is performed for the input original image, the pixel data of the original image are rearranged in a staggered array (step S421).

The respective pixels arranged in the staggered array are rearranged in a line in the main scanning direction and sub-scanning direction (step S422). Multilevel quantization processing and error diffusion processing like those described above are performed for the respective pixels rearranged in a line (step S423). Finally, the pixels having undergone the multilevel quantization processing and error diffusion processing are rearranged in the original staggered array (step S424).

By performing such multilevel error diffusion processing, a quantization error corresponding to each pixel can be diffused to the nearest adjacent pixel. This eliminates the necessity to prepare any special error diffusion coefficient. That is, in the above multilevel error diffusion processing, multilevel quantization processing and multilevel error diffusion processing can be easily performed for only pixels to be actually recorded by the alternate driving scheme.

As described above, when multilevel error diffusion processing is performed for the ghost image 303, the respective dots corresponding to pixel data for printing operation are printed in a properly dispersed state. For this reason, the dots of the binary image 306 embedded in the ghost image 303 are also dispersed. When, therefore, the dots corresponding to the pixel data for printing operation are dispersed, some dots of the binary image 306 embedded in the ghost image 303 are lost. If, however, multilevel error diffusion processing, since the density of the image is maintained from a macroscopic viewpoint, the shape of the embedded binary image 306 is held.

When the dots of the binary image 306 are properly dispersed, the binary image 306 embedded in the ghost image 303 becomes difficult to perceive by the human eye. This is because the human eye perceives a given image upon averaging the densities of neighboring images. According to the fourth embodiment, therefore, the binary image 306 embedded in the ghost image 303 can be made difficult to perceive, and hence the security of the printed material 301 can be improved.

The fifth embodiment will be described next.

FIG. 33 is a flow chart showing a processing sequence according to the fifth embodiment. The flow chart of FIG. 33 shows a printing sequence for a facial image 302 and ghost image 303 according to the fifth embodiment.

Printing processing of the facial image 302 is performed by the same sequence as that for the processing in FIG. 24 (steps S301 to S304). Assume that the image processing in step S303 as the printing processing of the facial image 302 additionally includes the processing of rearranging the pixel data of only a facial image in a staggered array.

The printing processing of the ghost image 303 is equivalent to the processing in steps S301 to S307 in FIG. 24 to which binary error diffusion processing (step S509) is added. That is, as shown in FIG. 29, the printing processing of the ghost image 303 is performed by sequentially executing facial image capturing processing (step S301), reduction processing (step S305), density reduction processing (step S306), electronic watermark embedding processing (step S307), color conversion processing (step S302), image processing (step S303), binary error diffusion processing (step S509), and recording signal conversion processing (step S304).

The binary error diffusion processing (step S209) shown in FIG. 29 is performed for the image data of the ghost image 303 having undergone the image processing in step S303 described above. The above recording signal conversion processing (step S304) is performed for the ghost image 303 having undergone the binary error diffusion processing in step S509 described above.

In the printing processing of the ghost image 303, the above facial image capturing processing (step S301), reduction processing (step S305), density reduction processing (step S306), electronic watermark embedding processing (step S307), color conversion processing (step S302), and image processing (step S303) are the same as those shown in FIG. 24 (steps S301 to S307). In the electronic watermark embedding processing in step S307, to-be-embedded binary image data is embedded in ghost image data without being inclined. In addition, the pixels of the ghost image are not rearranged in a staggered array.

In the binary error diffusion processing in step S509, the processing described with reference to FIGS. 30 and 31 is performed. For example, the quantization level is set to only "255", and a threshold of "127" is selected. Alternatively, thresholds may be determined by random numbers to disperse pixels more properly and make it difficult to produce noise such as a texture. Note that quantization processing is not limited to error diffusion processing. For example, other kinds of quantization processing such as dither processing may be used.

If binary error diffusion processing is performed as in the fifth embodiment described above, dots as pixels for printing operation need not be arranged in a staggered array. According to the fifth embodiment, therefore, the ratio of pixel data lost to all the pixel data of an embedded binary image 306 can be reduced. In the fifth embodiment, since there is no need to array dots as pixels for printing operation in a staggered array, it is not necessary to perform the processing of inclining the to-be-embedded binary image 306. In addition, according to the fifth embodiment, performing binary error diffusion makes it possible to properly disperse dots and makes it difficult to perceive the embedded binary image 306 by the human eye. Therefore, the security of the printed material 301 can be improved.

When the authenticity of the printed material 301 created by using the third, fourth, and fifth embodiments is to be determined, the ghost image 303 is read by a scanner or the like. The embedded binary image 306 is then restored from the read image data, and its authenticity is determined. When a hologram pattern 307 is present in the portion where the binary image 306 is embedded, the hologram pattern 307 is read together. This makes it necessary to remove the influence of the hologram pattern by applying a special filter.

In the third, fourth, and fifth embodiments, however, as shown in FIG. 23 or 28, protective layer is formed to prevent the hologram pattern 307 from being formed in the portion where the binary image 306 of the ghost image 303 is embedded. When authenticity determination is to be performed, therefore, the influence of the hologram pattern 307 can be eliminated, and there is no need to perform extra processing.

The third, fourth, and fifth embodiments have exemplified the case wherein a facial image is a color multilevel image. However, the present invention is not limited to this. For example, a facial image may be a monochrome image. In addition, the present invention can be applied to a printed material on which a monochrome multilevel image such as a sign is printed.

As has been described in detail above, according to the third, fourth, and fifth embodiments, a printed material having high security and a printing method which is used to create a printed material having high security can be provided.

What is claimed is:

1. An image processing method of creating composite image information by embedding sub-information in main image information, comprising:
    performing, for the main image information, first pre-processing corresponding to pixel formation processing for image recording;
    performing second pre-processing as geometric transformation processing for the main image information having undergone the first pre-processing;
    performing embedding processing of creating composite image information by embedding sub-information in the main image information; and
    performing transformation processing inverse to the transformation processing in the second pre-processing for the composite image information created by the embedding processing.

2. An image processing method of recording, on a recording medium in a visible state, composite image information created by embedding sub-information in visible main image information in an invisible state, comprising:
    performing, for the main image information, first pre-processing corresponding to pixel formation processing for image recording;
    performing second pre-processing as geometric transformation processing for the main image information having undergone the first pre-processing;
    performing embedding processing of creating composite image information by embedding sub-information in the main image information having undergone the second pre-processing in an invisible state;
    performing transformation processing inverse to the transformation processing in the second pre-processing for the composite image information created by the embedding processing; and
    recording, on a recording medium, the composite image information, inversely transformed by the inverse transformation processing, by performing an alternate driving/recording scheme of alternately recording even-numbered and odd-numbered pixels in a main scanning direction of a recording device on a recording line basis.

3. A method according to claim 2, wherein in the embedding processing, sub-information is embedded in main image information in an invisible state by performing color difference modulation processing using a preset, predetermined color difference amount.

4. A method according to claim 2, wherein in the embedding processing, the preset color difference amount is corrected in accordance with each pixel information of the main image information on a pixel basis, and sub-information is embedded in the main image information in an invisible state by performing color difference modulation processing by using the corrected color difference amount.

5. A method according to claim 2, wherein in the embedding processing, a processing of compressing a distribution of pixel luminance values of the main image information into a predetermined range is performed before embedding of the sub-information.

6. A method according to claim 5, wherein the processing of compressing the distribution of the pixel luminance values of the main image information comprises processing of omitting values not less than an upper limit value of a color plane of each pixel and not more than a lower limit value thereof.

7. A method according to claim 5, wherein the processing of compressing the distribution of the pixel luminance values of the main image information comprises processing of omitting values not less than an upper limit value of a color plane of each pixel and not more than a lower limit value thereof, and processing of correcting a tone curve after the omitting processing into a straight line.

8. A method according to claim 2, wherein in the embedding processing, a distribution of pixel luminance values of the main image information before embedding of the sub-information into a predetermined range, the sub-information is embedded in the main image information having undergone the compression processing, and processing inverse to the compression processing is performed.

9. A method according to claim 2, wherein in the embedding processing, color difference modulation processing is performed by using the main image information, the sub-information, and key information used to restore the sub-information, thereby creating composite image information.

10. A method according to claim 9, in which the key information is constituted by a geometric pattern having a predetermined specific frequency component, and which further comprises optically reading the composite image information from a recording object on which the composite image information is recorded, and restoring the sub-information from the composite image information by performing filter processing for the optically read composite image information using a frequency filter using a specific frequency component of the key information.

11. A method according to claim 9, wherein the key information is constituted by a geometric pattern having a predetermined specific frequency component, and in the first pre-processing, after processing of removing a frequency component identical to the specific frequency component of the key information from the main image information or weakening the frequency component, processing corresponding to the pixel forming processing at the time of image recording is performed for the main image information.

12. A method according to claim 9, wherein the key information is constituted by a geometric pattern having a predetermined specific frequency component and includes a plurality of pieces of key information, and in the embedding processing, frequency component analysis of the main image information is performed, and composite image information is created by selecting key information corresponding to one of said plurality of pieces of key information which has a frequency component having the lowest similarity to the frequency component of the main image information.

13. An image processing method of recording, on a recording medium in a visible state, composite image information created by embedding sub-information in visible main image information in an invisible state, comprising:

performing first pre-processing of thinning out main image information in correspondence with pixel formation processing at the time of image recording;

performing second pre-processing including geometric transformation processing of, after rotating the main image information through a predetermined angle, removing a thinned-out portion from the main image information, compressing an effective portion of the main image information, and reconstructing the main image information;

performing embedding processing of embedding the sub-information in the main image information having undergone the second pre-processing in an invisible state by performing color difference modulation processing using the main image information, the sub-information, and key information used to restore the sub-information, thereby creating composite image information;

performing inverse transformation processing of performing transformation processing inverse to transformation processing in the second pre-processing for the composite image information after expanding and reconstructing an effective portion of the composite image information by inserting, in the composite image information, not-to-be-recorded information corresponding to the thinned-out portion of the main image information; and performing recording processing of recording, on a recording medium, the composite image information, inversely transformed by the inverse transformation processing, by performing an alternate driving/recording scheme of alternately recording even-numbered and odd-numbered pixels in a main scanning direction of a recording device on a recording line basis.

14. A method according to claim 13, wherein in the first pre-processing, when the main image information is to be thinned out, even-numbered and odd-numbered pixels are alternately thinned out in correspondence with a recording line of a recording device.

15. An image processing method of recording, on a recording medium in a visible state, composite image information created by embedding sub-information in visible main image information in an invisible state, comprising:

performing first pre-processing of thinning out main image information in correspondence with pixel formation processing at the time of image recording;

performing second pre-processing including geometric transformation processing of, after rotating the main image information through a predetermined angle, removing a thinned-out portion from the main image information, compressing an effective portion of the main image information, and reconstructing the main image information;

performing embedding processing of embedding the sub-information in the main image information in an invisible state by superimposing the main image information and superimposition information created by performing color difference modulation processing using the sub-information and key information used to restore the sub-information, thereby creating composite image information;

performing inverse transformation processing of performing transformation processing inverse to transformation processing in the second pre-processing for the composite image information after expanding and reconstructing an effective portion of the composite image information by inserting, in the composite image information, not-to-be-recorded information corresponding to the thinned-out portion of the main image information; and performing recording processing of recording, on a recording medium, the composite image information, inversely transformed by the inverse transformation processing, by performing an alternate driving/recording scheme of alternately recording even-numbered and odd-numbered pixels in a main scanning direction of a recording device on a recording line basis.

16. An image recording apparatus comprising:

a first pre-processing section which thins out main image information in correspondence with pixel formation processing in the image recording apparatus;

a second pre-processing section which performs second pre-processing including geometric transformation processing of, after rotating the main image information through a predetermined angle, removing a thinned-out portion from the main image information, compressing an effective portion of the main image information, and reconstructing the main image information;

an embedding processing section which embeds the sub-information in the main image information in an invisible state by performing color difference modulation processing, thereby creating composite image information;

an inverse transformation processing which performs inverse transformation processing of performing transformation processing inverse to transformation processing in the second pre-processing for the composite image information after expanding and reconstructing an effective portion of the composite image information by inserting, in the composite image information, not-to-be-recorded information corresponding to the thinned-out portion of the main image information; and a recording section which performs recording processing of recording, on a recording medium, the composite image information, inversely transformed by the inverse transformation processing section, by performing an alternate driving/recording scheme of alternately recording even-numbered and odd-numbered pixels in a main scanning direction of a recording device on a recording line basis.

* * * * *